(12) United States Patent
Ohsugi

(10) Patent No.: US 7,295,225 B2
(45) Date of Patent: Nov. 13, 2007

(54) LIGHT SOURCE AND LIGHT BEAM SCANNING UNIT

(75) Inventor: Tomoya Ohsugi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 362 days.

(21) Appl. No.: 10/663,759

(22) Filed: Sep. 17, 2003

(65) Prior Publication Data

US 2004/0125192 A1   Jul. 1, 2004

(30) Foreign Application Priority Data

Sep. 19, 2002   (JP)   .............................. 2002-273804

(51) Int. Cl.
*B41J 27/00* (2006.01)
(52) U.S. Cl. ..................................... 347/244; 347/258
(58) Field of Classification Search ........ 347/241–245, 347/256–259, 238; 372/50.23; 385/33, 385/39, 92–93; 353/24
See application file for complete search history.

(56) References Cited

U.S. PATENT DOCUMENTS

| 5,315,609 | A | * | 5/1994 | Tanaka et al. | ........... 372/50.23 |
| 5,870,133 | A | * | 2/1999 | Naiki | .......................... 347/247 |
| 6,621,512 | B2 | * | 9/2003 | Nakajima et al. | ........... 347/245 |

FOREIGN PATENT DOCUMENTS

| JP | 7-181410 | | 7/1995 |
| JP | 07262588 A | * | 10/1995 |
| JP | 8-7294 | | 1/1996 |
| JP | 08005882 A | * | 1/1996 |
| JP | 08007294 A | * | 1/1996 |
| JP | 09186395 A | * | 7/1997 |
| JP | 10-284803 | | 10/1998 |
| JP | 11086296 A | * | 3/1999 |

* cited by examiner

*Primary Examiner*—Hai Pham
(74) *Attorney, Agent, or Firm*—Oblon, Spivak, McClelland, Maier & Neustadt, P.C.

(57) ABSTRACT

Light source and light beam scanning units with reduced deviation of beam positions over time and ambient conditions, in use for image forming apparatuses. In the light source unit for emanating light beams, including a plurality of LEDs and coupling lenses each corresponding to the LEDs, there are provided lens holders having two supporting faces aligned approximately parallel to the optical axes of the coupling lenses, elastic members for abutting the coupling lenses by pressing the side portions thereof onto the supporting faces, light source support members for holding LEDs corresponding to the coupling lenses, and bolts for fixing the light source support members. Following the proper adjustment of the position of the lens holder in the vertical direction with respect to the optical axes of the coupling lenses, the light source support members is fixed onto lens holder by bolts.

39 Claims, 13 Drawing Sheets

FIG. 15 (PRIOR ART)
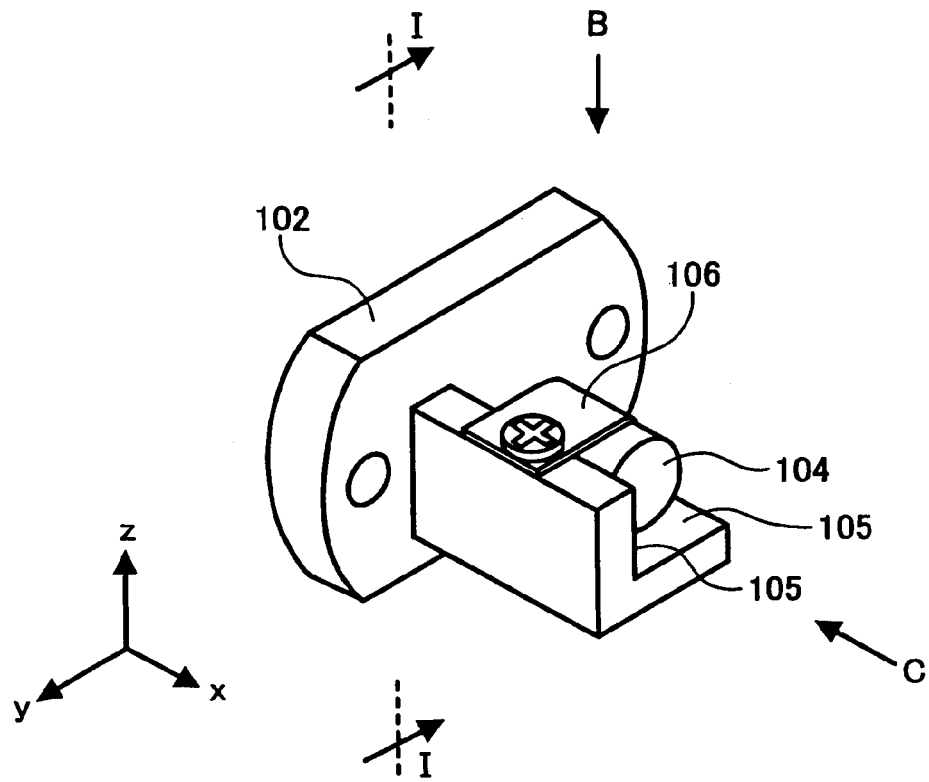
(PRIOR ART) FIG. 16
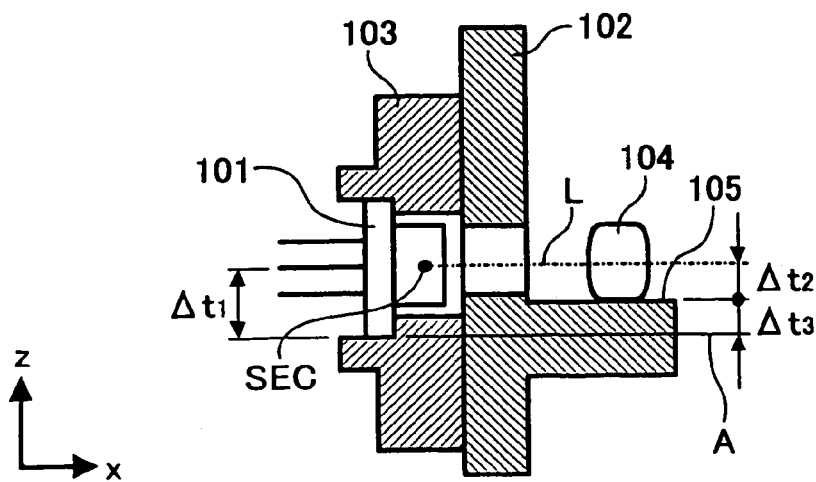

LIGHT SOURCE AND LIGHT BEAM SCANNING UNIT

BACKGROUND

1. Field

The present invention relates to light source and light beam scanning units in use for image recording systems such as a laser printer, digital duplication machine, facsimile apparatus and other similar systems.

2. Discussion of the Background

In many recent developments of digital duplication machines, laser printers and facsimile apparatuses, more attention has been focused on the increase in speed and image quality of information recording, among others. In order to materialize such improved capabilities, it is desirable for light source and light beam scanning units to have high-precision and stability of aligned light beam axes, ease of adjustment, and multiple-beam scanning capability.

The light source and scanning unit generally includes at least a semiconductor laser device as light source, and coupling lenses for coupling the light beams emanated from the source by properly transmitting to the following optical units as a parallel, converging or diverging beam as prescribed.

Such light source unit is required to have basic requirements of optical properties such as the directivity of laser beams emanated from the source (i.e., optical axis characteristics), and the property of the beams of being parallel, suitably converging or diverging (i.e., coupling characteristics).

The light source unit, therefore, has to retain proper positions with high precision of light emitting points and coupling lenses, with respect to each other at the time of initial adjustment, after variation with time and through the changes in ambient conditions.

An exemplary light source unit included in a scanning unit is disclosed in Japanese Laid-Open Patent Application No. 8-7294, including at least an LED 101 and lens holder 102 shown in FIGS. 15 and 16.

FIG. 15 is a perspective view of the lens holder 102 and a collimator lens 104 and FIG. 16 is a cross-sectional view taken along the line I-I of the structure of FIG. 15.

This disclosure relates primarily to a method for holding the collimator lens 104 through press-holding against an L-shaped abutting face 105 or a V-shaped groove by a pressing means 106 without known methods such as, for example, applying adhesive agents. This method, however, appears to fall short of offering satisfactory solutions to several points which follow.

① Difficulties caused by the difference in coefficients of thermal expansion: To be more specific, the package portion of LED 101 is generally made of iron alloy materials, while the kind of materials for forming the collimator lens 104 is glass or resinous materials in general.

In addition, a light source supporting portion 103 and lens holder 102 as the supporting members for the LED source 101 and collimator lens 104, respectively, are often made of aluminum or resinous materials.

Since the coefficients of linear thermal expansion are different each other for the materials used in the package portion of LED 101, collimator lens 104, source supporting portion 103 and lens holder 102, a deviation may arise in the relative position of emitting source point SEC and the optical axis L of the collimator lens 104.

This deviation is exemplified by several changes in the position against the point A shown in FIG. 16.

That is, since the amount of positional change (i.e., elongation or shrinkage) in the secondary scanning direction (z-axis) in the vicinity of the light source (LED) 101, which is denoted by $\Delta t1$, differs from the positional change in the vicinity of the collimator lens 104, which is denoted by $(\Delta t2+\Delta t3)$, there gives rise to the deviation in the relative position of, or the discrepancy between, the emitting source point SEC and the optical axis L of the collimator lens 104, thereby resulting in the relation $$\Delta t1 \neq \Delta t2+\Delta t3.$$

② Difficulties in insufficient alignment: As shown in FIG. 17, which depicts as the device of FIG. 15 viewed in the B direction, if the friction of the collimator lens 104 is unduly high against the L-shaped abutting face 105 or V-shaped groove as guiding means 106, or the hardness of the pressing means 106 is not high enough for proper abutting, and the collimator lens 104 cannot completely follow after the guiding means 106. This may result in slant-abutting as shown in FIG. 17, in which the collimator lens 104 is held by being in contact with only two locations but not in a linear manner (denoted by the mark '•'), thereby giving rise to rather unstable holding conditions.

As a result, the alignment of the collimator lens 104 may be disturbed by vibration and/or the change in ambient temperatures.

Furthermore, since the direction of the light beams is altered generally not only by the positional deviation but also by the change in the alignment of the collimator lens 104, the direction of light beams emanated presently also change with the variation of the alignment.

③ Furthermore, when the pressing member 106 for pressing collimator lens 104 is formed of the shape shown in FIG. 18, which depicts the device of FIG. 15 viewed in the C direction, and when the coefficient of linear thermal expansion of the pressing member 106 is larger than that of the collimator lens 104 and lens holder 102, the former becomes more elongated with the increase in temperature. This generates a force denoted by the arrow D in FIG. 18, which acts onto the collimator lens 104, and a concomitant component force along the abutting face 105. As a result, the position of the collimator lens 104 may cause a change in the direction of light beams.

As to the means for the aforementioned increase in the output capability of image forming apparatus, several methods will be cited such as (1) increasing the speed of translation (or rotation) of image bearing member, and (2) utilizing a plurality of image bearing members.

For implementing the improvement according to method (1), the speed of light beam scanning unit for writing image data into the image forming member has to be increased, and that method for increasing the speed of writing image data into the image forming member, in turn, conceivably requires the increase in (i) rotation speed of the polygon scanner as a beam deflecting means, and (ii) the number of light beams for use in writing.

However, several difficulties are encountered such as insufficient durability of the driving motor, undue noise, vibration, and/or speed of laser beam modulation with respect to the method (i), and the need for a light source unit emanating multiple laser beams with the method (ii).

As an exemplary multiple beam source unit, the use of a semiconductor laser array is mentioned, which is provided with a plural light emitting points (or light emitting channels) in one package.

Such semiconductor laser array, however, is rather expensive for practical application at present since it is difficult to increase the channels for the reasons of fabrication process, remove undue effects from thermal and electrical cross-talk, and materialize shorter emission wavelengths.

In addition, present market price per unit channel of the semiconductor laser array rather increases with the increase of the number of light emitting points in a package. For example, the price of one semiconductor laser array with four light emitting points is considerably higher than four pieces of single-beam laser diodes when used for the scanning light source.

Accordingly, further light source units or multiple-beam scanning units have been disclosed, for example, using plural single-beam laser diodes (or diodes each having a relatively small number of light emitting points) with emitted light beams to be subsequently synthesized and scanned, as described in Japanese Laid-Open Patent Application No. 10-284803.

In the above noted multiple-beam scanning units, the relative position of, or the distance between, the plural beams along the vertical scanning direction on image forming member is important. Namely, if the deviation in the relative position from the prescribed value arises, this deviation will show up repeatedly in picture images, thereby causing faulty images accompanied by periodic undue stripes.

Therefore, it is of primary importance to reduce the deviation in the relative position of the light emitting points and coupling lens within the prescribed value.

The deviation in relative position of the plural beams along the horizontal scanning direction on image forming member can be corrected with relative ease by adjusting the activation timing of light emission following the synchronization detection by a synchronization detector means.

In contrast, the deviation along the vertical scanning direction is more difficult in general, whereby a more complicated system for correcting thereof is preferred.

In addition, in a beam scanning unit disclosed in Japanese Laid-Open Patent Application No. 7-181410 (which is cited in the Application No. 10-284803), there is provided a fitting allowance of approximately from 0.01 to 0.03 mm between the lens holder and collimator lens, and the lens holder and fitting hole on a flange, respectively, to be filled with, and subsequently fixed by hardening an adhesive agent.

The adhesive agent has, in general, a relatively large change in shape and volume through shrinking during hardening, variation with time, and the change of ambient conditions. Moreover, the noted allowance may differ from one unit to another due to dispersion during fabrication, which results in further variation of the amount of adhesive agent. These factors may add up to the change in relative position between plural collimator lens through shrinking during hardening, variation with time, and the change of ambient conditions. As a result, this causes the change or deviation in the position of plural light beams relative to each other, which is illustrated with two light beams shown in FIG. 19.

Also in the beam scanning unit disclosed in the Japanese Application No. 7-181410, the aligning steps are carried out for fixed LEDs through the adjustment of relative position of collimator lenses by tri-axially displacing each lens and the subsequent fixing with adhesive agent.

When a certain allowance for the adjustment is taken into consideration, a clearance of approximately 0.2 mm is needed between collimator lens and lens holder, to be subsequently filled with the adhesive. Because of this rather thick adhesive layer and following positional adjustment, a deviation in the position of collimator lens may result as much as about ±0.1 mm.

As a result, the overall thickness of adhesive layer may amount to be in the range of from 0.1 to 0.3 mm, thereby causing a large dispersion in finished units. Therefore, relatively large dispersion (or fluctuation) in the position of collimator lens also results from one unit to another.

In addition, a fitting face of the lens holder against the collimator lens is formed as a circle concentric with the collimator lens. If the collimator lens 104 is fixed to a position deviated in the vertical scanning direction (z-axis) as shown in FIG. 19, a deviation arises in the thickness of adhesive agent 107 in that direction, which results in with relative ease the positional deviation in collimator lens 104 in the vertical scanning direction due to the expansion and contraction of the layer of adhesive agent caused by ambient conditions.

As a result, because of the positional deviation of collimator lens 104 in the vertical scanning direction and the noted relatively large dispersion in the position of collimator lens from one unit to another, the deviation in relative position of two beam spots formed on the image forming member may increase.

Incidentally, the positional relation between the collimator lens 104 and lens holder fixed by the adhesive agent 107 is shown in FIG. 19.

Furthermore, when the light source unit of FIG. 15 is utilized as one of the beam sources to be synthesized using a prism, the discrepancy may arise, due to the aforementioned methods ①, ② and ③, in relative position between emitting source point SEC and optical axis L of the collimator lens 104 along the y- or z-direction, and the direction of the light beam emanated and transmitted through the collimator lens 104 changes, whereby the relative position of plural beams following the beam synthesis is unduly affected.

As a result, the deviation in relative position of two beam spots formed on the image forming member results and this may degrade picture image qualities of image outputs.

In addition, as the means for increasing output speed for image forming apparatus, there can be cited the case of color image forming apparatus incorporating four image forming members along the line of the aforementioned method ②, which requires plural light beams for writing images of the corresponding number.

In such case, when the position of light beams to be scanned, for writing images, over respective image forming members deviates relative from each other due to the change over time and/or ambient conditions, the precise overlap of printed colors may not be able to achieve, to thereby result so-called shear in color printing.

SUMMARY

Accordingly, it is an object of the present disclosure to provide an improved multiple-beam light source for laser beam scanning unit, having most, if not all, of the advantages and features of similar employed systems, while eliminating many of the aforementioned disadvantages.

It is another object to provide such light source unit having high-precision and stability of aligned light beam axes with reduced deviation in relative beam position over time and ambient conditions, in use for image forming apparatuses of and excellent image qualities and low costs.

The following description is a synopsis of only selected features and attributes of the present disclosure. A more complete description thereof is found below in the section entitled "Description of the Preferred Embodiments."

In a light source unit for emanating light beams, including at least a plurality of light sources, and a plurality of coupling lenses each corresponding to the light sources, the light source unit disclosed herein is characterized by including a coupling lens holding unit having a first and a second holding faces aligned approximately in parallel to an optical axis of the coupling lens, and an elastically pressing member for pressing a side portion of the coupling lens against the first and second holding faces so as to hold the coupling lens.

In addition, further included are a light source holding unit for holding a light source corresponding to the coupling lens out of the plurality of light sources and a fixing member for fixing the light source holding unit, in which the fixing member operates to fix the position of the light source displaceable over the plane perpendicular to the optical axis of coupling lens.

Still in addition, a supporting unit is formed, as one set, consisting of the first and second holding faces aligned approximately in parallel to the optical axis of coupling lens for holding the coupling lens, and at least two sets of the supporting unit are formed integrally as one component.

Alternatively, a supporting unit is formed, as one set, consisting of the first and second holding faces aligned approximately parallel to the optical axis of coupling lens for holding the coupling lens. At least two sets of the supporting unit are arranged such that the direction of the at least two sets, in terms of a direction of the optical axis, the primary and secondary scanning directions, is either equal, or symmetrical to each other.

In addition, at least one of coupling lens and holding face is provided with a lubricating means at the location in contact there between, or alternatively, a portion of the coupling lens in contact with the holding face is subjected to surface hardening.

Furthermore, an elastically pressing member is formed of planar elastic material for both ends thereof to be fixed so as to hold in between the portion of the coupling lens in contact with the holding face, and the elastically pressing member has a coefficient of linear expansion approximately equal to that of the material of coupling lens holding unit.

The light source unit disclosed herein is further provided with another light source holding unit for holding a light source attached to the coupling lens holding unit, in which the coupling lens holding unit, a package unit of a semiconductor laser diode, and the light source holding unit are formed of the materials which are selected to satisfy the relations, either (1) in case of $\alpha 1 \leq \alpha 3$, $\alpha 1 \leq \alpha 2 \leq \alpha 3$ and $\alpha 1 \leq \alpha 4 \leq \alpha 3$, or (2) in case of $\alpha 3 \leq \alpha 1$, $\alpha 3 \leq \alpha 2 \leq \alpha 1$ and $\alpha 3 \leq \alpha 4 \leq \alpha 1$, where $\alpha 1(1/K)$, $\alpha 2(1/K)$, $\alpha 3(1/K)$ and $\alpha 4(1/K)$ are coefficients of linear thermal expansion of the coupling lens, coupling lens holding unit, package unit and light source holding unit, respectively.

A light beam scanning unit is also disclosed herein including anyone of the light source units described above, a light beam deflection unit for receiving and subsequently deflecting light beams emanated from the light source unit; and an optics system for focusing light beams onto a member to be scanned and scanning along the primary scanning direction.

The light beam scanning unit disclosed herein is characterized by forming the coupling lens, coupling lens holding unit, package unit of a semiconductor laser diode, and light source holding unit, of the materials which are selected in terms of coefficients of linear thermal expansion $\alpha 1$, $\alpha 2$, $\alpha 3$ and $\alpha 4$, and by adjusting radii r1 and r3 such that the positional deviation of light beams on the member to be scanned is controlled to be equal to, or smaller than 50% of a dot pitch of the light beams; where $\alpha 1(1/K)$, $\alpha 2(1/K)$, $\alpha 3(1/K)$ and $\alpha 4(1/K)$ are coefficients of linear thermal expansion of the coupling lens, coupling lens holding unit, package unit and light source holding unit, respectively; r1 (mm) is the distances from an optical axis of the coupling lens to the point of contact between coupling lens and holding face; and r3 (mm) is the outer radius of package unit.

Alternatively, the light beam scanning unit is characterized by forming the coupling lens, coupling lens holding unit, package unit of a semiconductor laser diode, and light source holding unit, of the materials which are selected in terms of coefficients of linear thermal expansion $\alpha 1$, $\alpha 2$, $\alpha 3$ and $\alpha 4$, and by adjusting radii r1 and r3, so as to satisfy the relations, either (1) $\alpha 2 = \alpha 4$ and $|\alpha 3 \times r3 - \{\alpha 1 \times r1 + \alpha 2 \times (r3 - r1)\}| \leq 2.5 \times 10^{-5}$ (mm/K), or (2) $|\alpha 3 \times r3 - \{\alpha 1 \times r1 + \alpha 2 \times (r3 - r1)\}| \leq 1$ μm at normal temperatures.

In addition, a plurality of the thus formed light source units can be arranged in row, which enables a plurality of light beams be scanned simultaneously.

An image forming apparatus is also disclosed herein including anyone of the light beam scanning unit recited in claims 14 through 18, and an image forming unit for rendering an image visible, which is written by the light beam scanning unit onto an image bearing member corresponding to input image data.

The image forming apparatus disclosed herein is further characterized by the light beam scanning unit and image forming unit provided for each color rendered visible by the image forming apparatus.

The light source and scanning unit disclosed herein can offer several advantages over similar known units.

For example, in the present light source provided with the pressing member of suitably selected shape and material, proper alignment of the light source with respect to collimator lens can be achieved with relative ease and the change in relative position with time and the change of ambient conditions can be alleviated.

In addition, by further adjusting the property of the materials for forming the components of the light source and beam scanning unit such as, for example, the coefficients of linear thermal expansion of the coupling lens, coupling lens holding unit, package unit and light source holding unit, the deviation in relative position can be reduced between the light emitting points and the optical axes of the lenses in the secondary scanning direction.

In another aspect, a plurality of the thus formed light source and beam scanning units can be arranged in row, which enables a plurality of light beams be scanned simultaneously to be incorporated into image forming apparatus and other similar systems.

The image forming apparatus suitably incorporating the light source units disclosed herein, the deviation in relative position between the plural light beams can be reduced, and output images can be obtained having excellent picture image qualities.

In addition, the color image forming apparatus suitably incorporating the light source and beam scanning units disclosed herein, the deviation in relative position between the plural light beams of respective colors can be reduced, excellent color picture qualities can be obtained with reduced shear in printing for the respective printed colors.

Further aspect of the present disclosure and the manner in which it addresses the above problems, as well as others, will become more readily apparent from the following detailed description when taken in conjunction with the accompanying drawings, detailed description, and claims.

BRIEF DESCRIPTION OF THE DRAWINGS

In the following drawings, like reference numerals will be used to refer to like elements as between the various figures, in which:

FIG. 15 is a perspective view of a lens holder and a collimator lens disclosed previously;

FIG. 16 is a cross-sectional view taken along the line I-I of the structure of FIG. 15;

DESCRIPTION OF THE PREFERRED EMBODIMENTS

In the detailed description which follows, specific embodiments of light source and scanning units in use for electrophotographic imaging are described. It is understood, however, that the present disclosure is not limited to these embodiments. For example, it is appreciated that the use of the multiple-beam light source and beam scanning unit disclosed herein may also be adaptable to any form of information recording system. Other embodiments will be apparent to those skilled in the art upon reading the following description.

Figure 1:
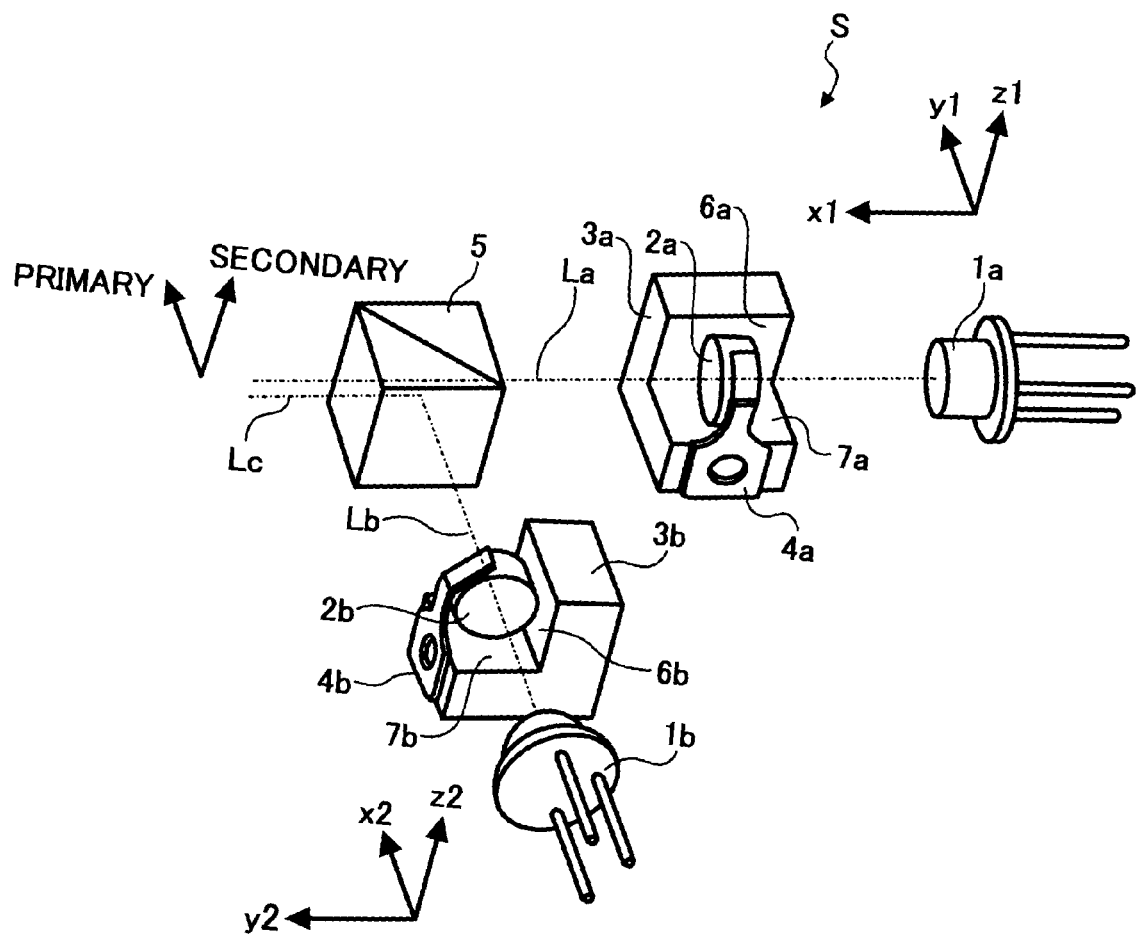
FIG. 1 is a perspective view illustrating the basic structure of the light source unit according to a first embodiment disclosed herein.
Figure 2:
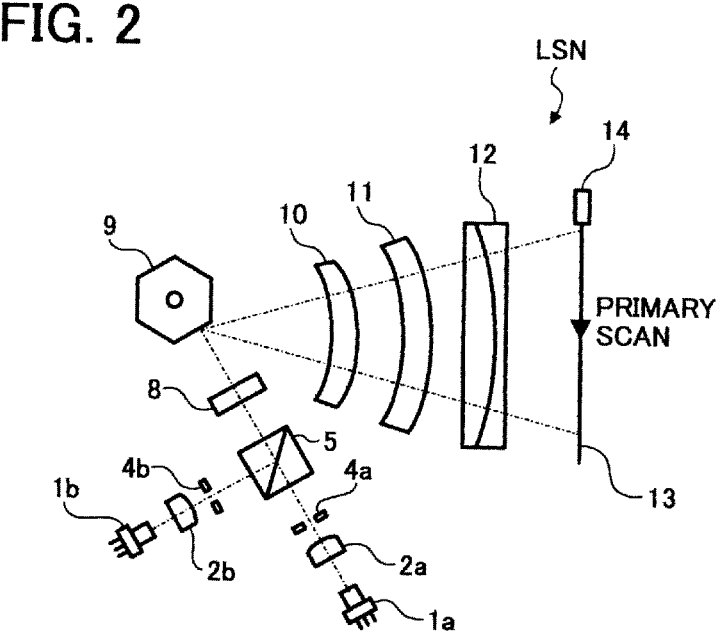
FIG. 2 illustrates a structure of the light beam scanning system into which the light source unit is suitably incorporated.
Figure 3:
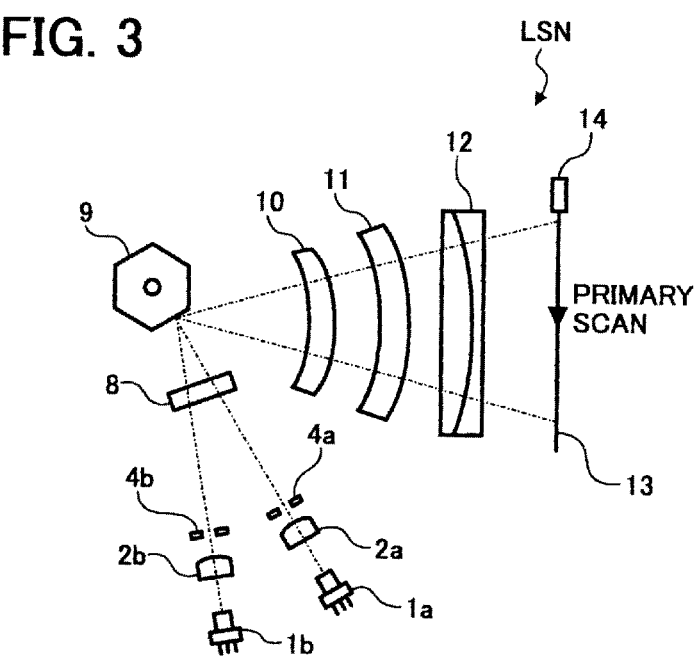
FIG. 3 illustrates a further structure of the light beam scanning system, in which, in place of the use of the beam synthesis prism, two light beams are brought to come across on the mirror face of the scanner so as to carry out beam synthesis and subsequent scanning.

FIG. 1 is a perspective view illustrating the basic structure of the light source unit according to a first embodiment disclosed herein, and FIGS. 2 and 3 are each plan views illustrating light beam scanning units into which the light source unit is suitably incorporated.

Referring to FIG. 2, a versatile double-beam light scanning system LSN consists of at least semiconductor laser diodes (LED) $1a$ and $1b$ as light sources, coupling lenses $2a$ and $2b$, apertures $4a$ and $4b$, a beam synthesis prism (beam synthesis means) 5, a cylindrical lens 8, a polygonal scanner (mirror) 9, f-θ lenses 10 and 11, and a toroidal lens 12.

By means of this construction, laser beams emanated from the laser diodes (LD) $1a$ and $1b$ are collimated by the coupling lenses $2a$ and $2b$, respectively, transmitted through the apertures $4a$ and $4b$, synthesized by the beam synthesis means 5, beam-shaped to be a linear beam, and adapted to be incident onto the polygonal scanner 9.

The laser beam thus incident onto the polygonal scanner 9 is deflected by mirrors formed on the respective faces of the scanner 9, transformed from constant angular velocity to constant linear velocity beam scanning by the f-θ lenses 10 and 11, compensated for beam tilt, adjusted to focusing properly in the secondary (vertical) scanning direction, image formed as a light beam spot on a image bearing member 13, and scanned along the primary (horizontal) scanning direction.

In addition, a synchronizing detector (sensor) 14 is provided outside the region for the image forming by the laser beam.

FIG. 3 illustrates a further structure of the light beam scanning system, in which, in place of the use of the beam synthesis prism 5, two light beams are brought to come across on the mirror face of the scanner 9 so as to carry out beam synthesis and subsequent scanning.

The structures shown in FIGS. 2 and 3 are often adapted to conventional light beam scanning systems. In addition, the components of FIG. 3 similar to those shown earlier in reference to FIG. 2 are herein shown with identical numerical representations and detailed description thereof is abbreviated.

In the following description on the light beam scanning system disclosed herein, the components of FIGS. 2 and 3 such as light source and coupling lens; and light source, coupling lens and beam synthesis means, are primarily shown for the light source units.

FIG. 1 is a perspective view illustrating the structure of the light source unit S according to one embodiment disclosed herein.

Referring to FIG. 1, the light source unit S includes at least a first and second semiconductor laser diodes (LED) $1a$ and $1b$ as light sources, a first and second coupling lenses $2a$ and $2b$, coupling lens supporting members (lens holders) $3a$ and $3b$, for holding the first and second coupling lenses, respectively, and a beam synthesis prism 5.

The first and second LEDs $1a$ and $1b$, are provided such that the optical axes La and Lb, of light beams from $1a$ and $1b$, respectively, are in one plane and come across with an angle of 90-degree, and that the first and second coupling lenses $2a$ and $2b$ are arranged to be perpendicular to the optical axes La and Lb, respectively.

In the noted light source unit, the laser beams emanated from the first and second LED's $1a$ and $1b$ transmitted through the first and second coupling lenses 2a and 2b, respectively, are synthesized by the beam synthesis prism 5 aligned approximately in the same direction.

If the directions of the primary and secondary scanning are designated as the arrows shown in FIG. 1 with respect to the optical axis Lc of synthesized light beam, the directions of the optical axis, primary and secondary scanning are given as (x1, y1, z1) and (x2, y2, z2) at the first and second light sources, respectively.

The first and second coupling lenses, 2a and 2b, are abutted through press-holding onto a first and second lens holders, 3a and 3b, by a first and second elastic members (springs), 4a and 4b, respectively.

The lens holders 3a and 3b are formed having supporting faces, 6a and 7a, and 6b and 7b, aligned parallel to the optical axes x1 and x2, respectively, thereby supporting the coupling lenses 2a and 2b.

Since the support of coupling lenses through press-holding can be attained by means of this structure without the known method such as, for example, applying adhesive agents, the change in distance caused by environmental change between the coupling lenses, 2a and 2b, and the supporting faces, 6a and 7a, and 6b and 7b, respectively, can be alleviated.

As a result, the variation of relative position following the beam synthesis for the two light beams is small, and the change in relative position of beam images formed on the image forming member 13 by the light beam scanning systems of FIGS. 2 and 3 can also be reduced.

The supporting faces, 6a and 7a of the first lens holder 3a, and 6b and 7b of the second lens holder 3b, are each arranged to have an angle of 90°.

In addition, the directions of the supporting faces, 6a and 7a, and 6b and 7b, in terms of the direction of the optical axis, primary and secondary scanning, (x1, y1, z1) and (x2, y2, z2), respectively, are arranged to be symmetric to one another with respect to the secondary scanning plane (i.e., the plane perpendicular to the optical axis and secondary scanning direction). The directions of the supporting faces, 6b and 7b, are also arranged in similar manner to be symmetric to one another with respect to the secondary scanning plane (i.e., the plane perpendicular to the optical axis and secondary scanning direction).

Figure 18:
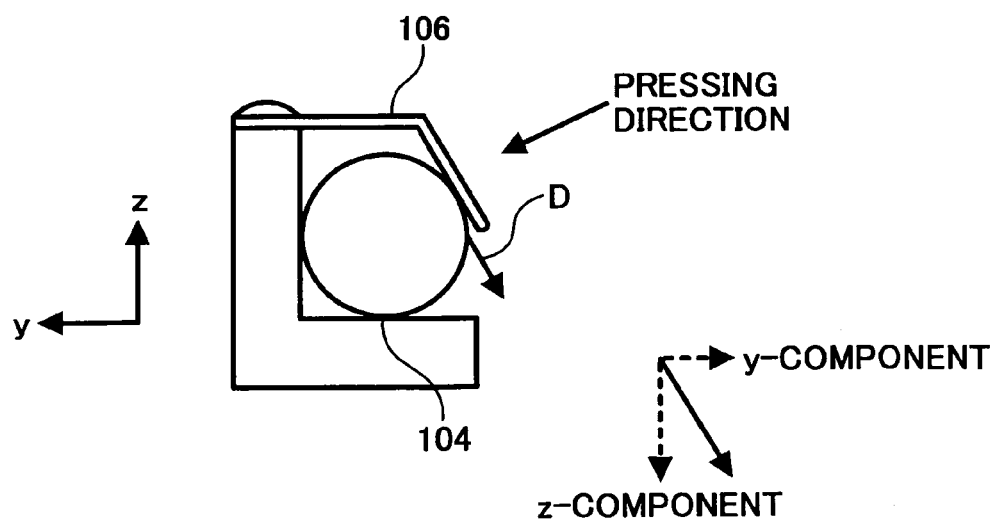
FIG. 18 shows a portion of FIG. 15 viewed from the C direction in the drawing.
Figure 19:
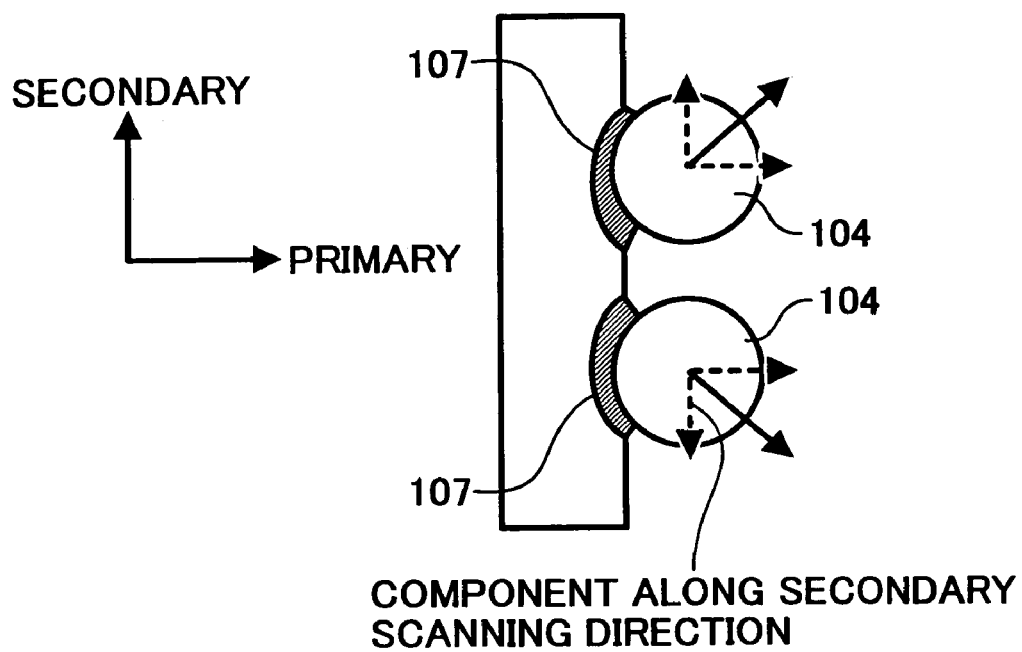
FIG. 19 illustrates the collimator lens and lens holder fixed by the adhesive agent.

In the known system shown in FIG. 18, the optical axes La and Lb of the coupling lenses 2a and 2b, respectively, may suffer from the deviation, possibly caused by the change in ambient conditions, in relative position along the primary and second scanning directions with respect to emitting source points for first and second lasers 1a and 1b.

In the present structure shown in FIG. 1, however, the amount of positional variation of the first LED 1a with respect to the optical axis La for the first coupling lens 2a can be brought to be approximately the same as that of the second LED 1b with respect to the optical axis Lb for the second coupling lens 2b at least in the secondary scanning direction.

As a result, the deviation in relative position of light beam spots on the image bearing member, formed through the light beam scanning systems of FIGS. 2 and 3, can be reduced.

Incidentally, although no aperture is shown in the unit of FIG. 1, it may be included by placing between the coupling lens 2a or 2b and beam synthesis prism 5.

Figure 4:
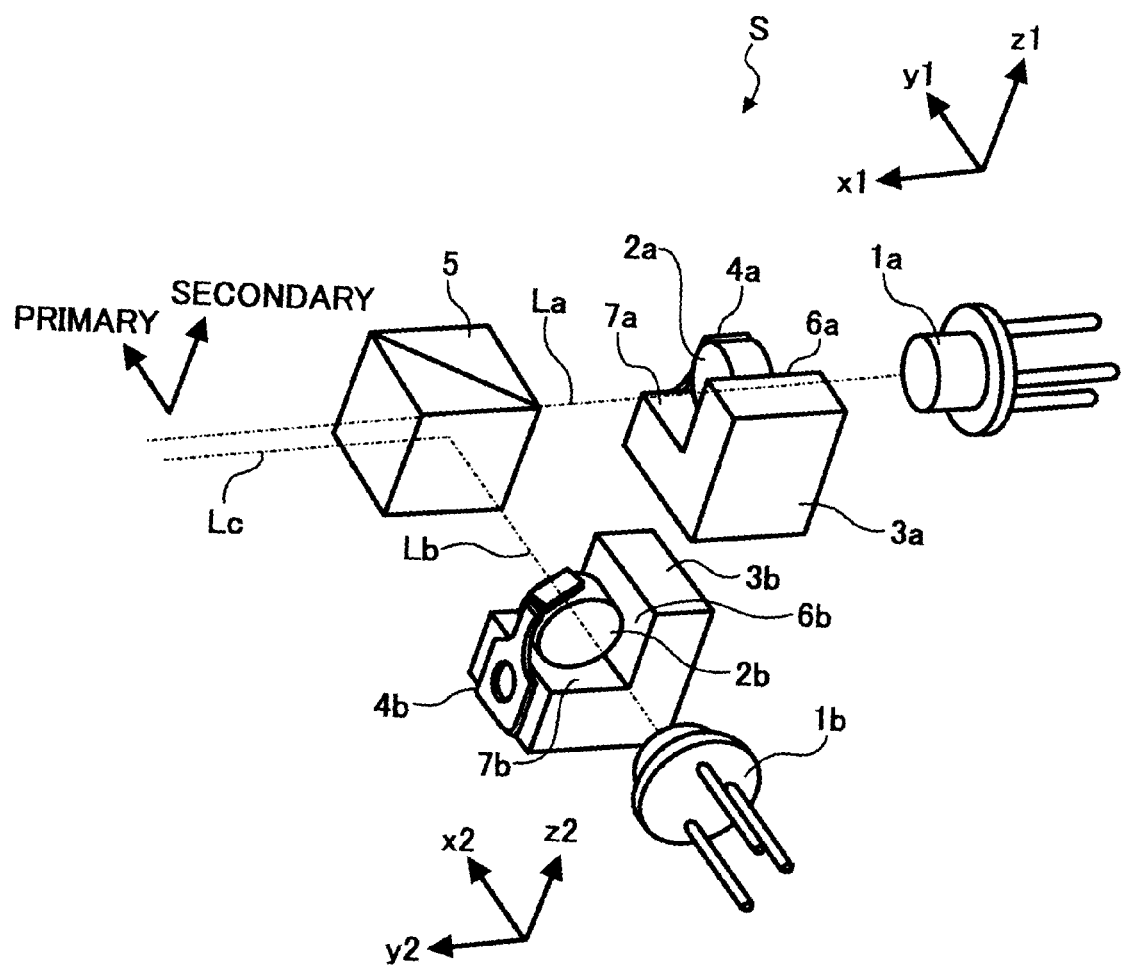
FIG. 4 is a perspective view illustrating the basic structure of the light source unit S according to a second embodiment disclosed herein.

FIG. 4 is a perspective view illustrating the basic structure of the light source unit S according to a second embodiment disclosed herein, in which the first coupling lens 2a and its lens holder 3a are arranged to be symmetric to the second coupling lens 2b and its lens holder 3b with respect to the straight line defined as the median of the optical axis La of light beams from 1a and optical axis Lb of light beams from 1b. Other components and the arrangement thereof are provided herein in a manner similar to those of FIG. 1.

Referring to FIG. 4, the laser beams emanated from the first and second LED's 1a and 1b transmitted through the first and second coupling lenses 2a and 2b, respectively, are synthesized by the beam synthesis prism 5 aligned approximately in the same direction.

If the directions of the primary and secondary scanning are designated as the arrows shown in FIG. 4, the directions of the optical axis, primary and secondary scanning are given as (x1, y1, z1) and (x2, y2, z2) at the first and second light sources, respectively.

The first and second coupling lenses 2a and 2b are abutted through press-holding onto supporting faces 6a and 7a, and 6b and 7b, on the first and second lens holders 3a and 3b by a first and second elastic members (springs) 4a and 4b, respectively, in a similar manner to FIG. 1.

The supporting faces 6a and 7a of the first lens holder 3a, and 6b and 7b of the second lens holder 3b, are each arranged to have an angle of 90°.

In addition, the directions of the supporting faces, 6a and 7a, and 6b and 7b, in terms of the direction of the optical axis, primary and secondary scanning, (x1, y1, z1) and (x2, y2, z2), respectively, are arranged to be the same.

In the known system as described earlier, the optical axes La and Lb of the coupling lenses 2a and 2b, respectively, may suffer from the deviation, possibly caused by the change in ambient conditions, in relative position along the primary and second scanning directions with respect to emitting source points for first and second lasers 1a and 1b.

In the present structure of FIG. 4, however, the amount of positional variation of the first LED 1a with respect to the optical axis La for the first coupling lens 2a can be brought to be approximately the same as that of the second LED 1b with respect to the optical axis Lb for the second coupling lens 2b.

As a result, the variation in relative position of light beam spots on the image bearing member can be reduced in a similar manner to that in the first embodiment.

Although the details are abbreviated herein, other components are utilized also in the present embodiment to be adapted to function in a similar manner to those in the first embodiment described earlier with reference to FIG. 1.

Figure 5:
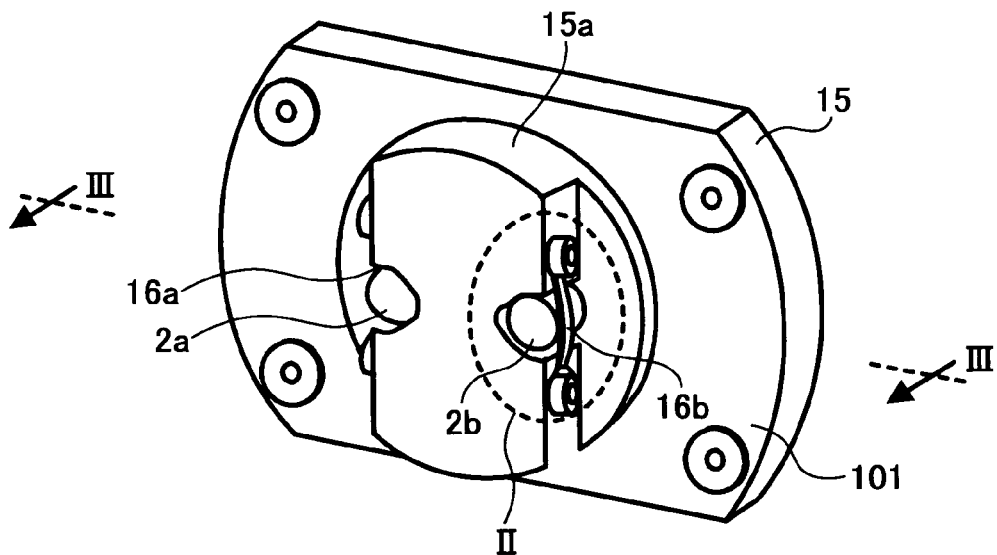
FIG. 5 is a frontal perspective view of the light source unit according to a third embodiment disclosed herein.
Figure 6:
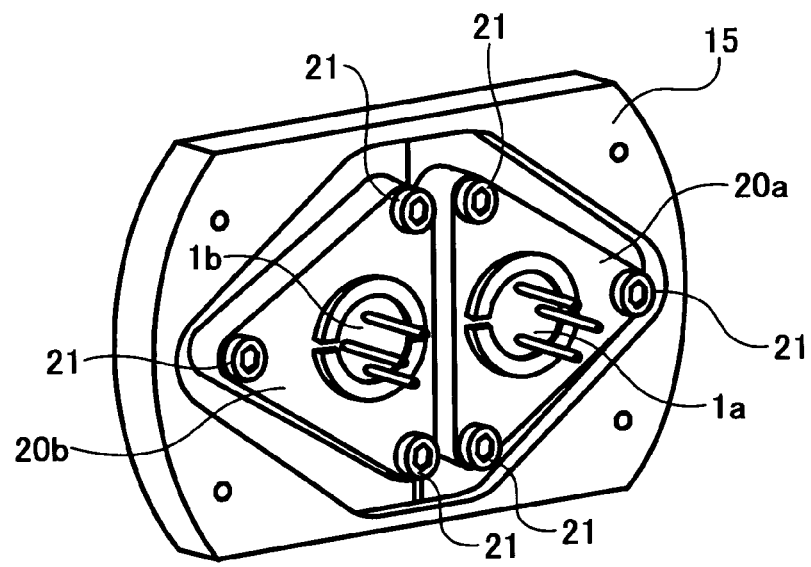
FIG. 6 is a rear perspective view of the light source unit according to a third embodiment disclosed herein.
Figure 7:
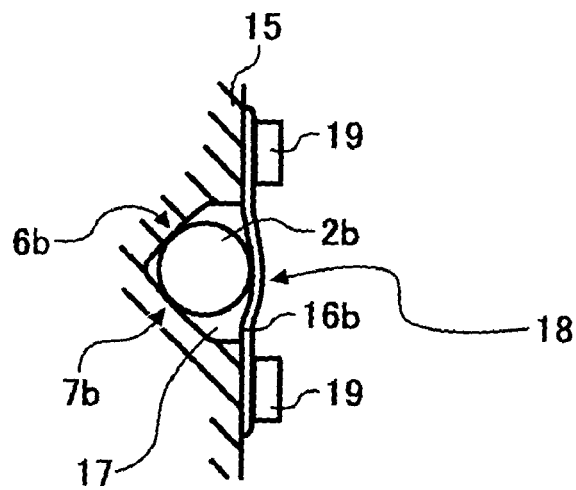
FIG. 7 is an enlarged view of the encircled portion II of the structure of FIG. 5.
Figure 8:
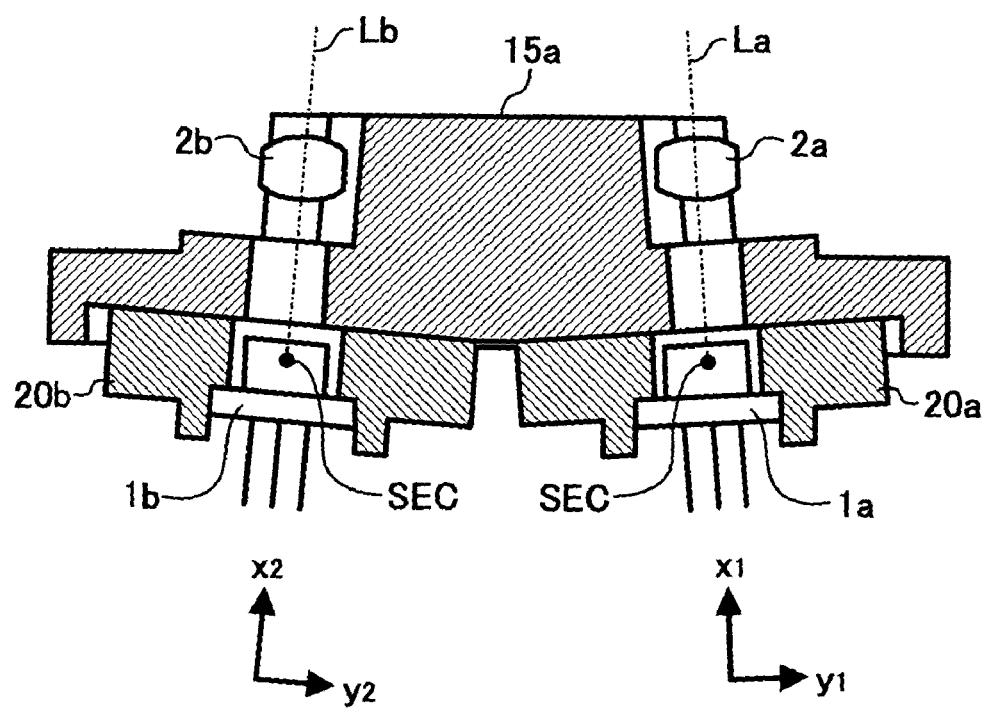
FIG. 8 is a cross-sectional view taken along the line III-III of the structure of FIG. 5.

FIGS. 5 through 8 are prepared to illustrate the basic structure of the light source unit according to a third embodiment disclosed herein, in which FIG. 5 is a frontal perspective view, and FIG. 6 is a rear perspective view, of the light source unit. In addition, FIG. 7 is an enlarged view of the encircled portion II in FIG. 5, and FIG. 8 is a cross-sectional view taken along the line III-III, of the structure of FIG. 5.

In the structure shown in FIGS. 5 through 8, an integrated lens holder 15 is provided to hold integrally both the coupling lenses 2a and 2b, in place of the two separate coupling lens holders 3a and 3b in the previous embodiments, which hold the lenses 2a and 2b, respectively.

By means of this integrated structure of lens holder 15, the variation in relative position of the coupling lenses, 2a and 2b, can be alleviated.

That is, as shown in FIG. 5, the coupling lens 2b is pressed against, and thereby supported by, the faces of a supporting groove 17 which is formed on one side of the lens support unit 15a provided as a protruded portion in combination with the lens holder 15. In addition, the coupling lens 2a, is also pressed against, and thereby supported by, the faces of another supporting groove 17 which is formed on the other side of the lens support unit 15*a*.

These faces (four faces) on the supporting grooves 17 are formed integrally on the lens holder 15. Furthermore, the supporting grooves 17 are each formed as so-called V-shaped grooves such that neighboring supporting faces 6*a* and 7*a*, and 6*b* and 7*b*, cross at right angle.

As shown in FIG. 7, the second coupling lens 2*b* is pressed elastically by a spring 16*b* against two supporting faces 6*b* and 7*b* on the supporting groove 17, and thereby supported in a positioning manner. In addition, the spring 16*b* is mounted onto the side of the lens support unit 15*a* with the both end thereof each being fixed by bolts symmetrically with respect to the point of contact 18 between the coupling lens 2*b* and the spring 16*b* so as to be pressed against the point of contact 18.

Similarly, the first coupling lens 2*a* is pressed elastically by a spring 16*a* against two supporting faces 6*a* and 7*a* (not shown) on the supporting groove 17, and thereby supported also in a positioning manner. In addition, the spring 16*a* is also mounted onto the lens support unit 15*a* with the both end thereof each being fixed by bolts symmetrically with respect to a further point of contact (not shown) on the opposing side of the lens support unit 15*a*.

As a result, both the coupling lenses 2*a* and 2*b* are held integrally by the integrated lens holder 15.

Even in the case where the coefficient of linear expansion is different for the lens holder 15 and springs 16*a* and 16*b*, the occurrence of the undue force as illustrated by the arrow in FIG. 18 can be alleviated with the present structure, and no deviation is thereby induced in the position of coupling lenses 2*a* and 2*b*.

Accordingly, the variation in the position of the coupling lenses 2*a* and 2*b* due to the change in ambient conditions can be reduced, and the variation in relative position of the light beams can also be alleviated.

In contrast to fixing the coupling lenses 2*a* and 2*b* described above, the first and second LEDs 1*a* and 1*b* are fixed onto light source support members 20*a* and 20*b* thorough press fitting into supporting (fitting) holes provided on the support members 20*a* and 20*b* as shown in FIG. 8.

The light source support members 20*a* and 20*b* are fixed onto the lens holder 15 by a plurality of bolts 21, 21 . . . , as shown in FIG. 6.

In addition, the fixing steps are carried out as shown in FIG. 8 such that the position of light emitting points SEC are aligned to the optical axes La and Lb of the coupling lenses 2*a* and 2*b*, respectively, by adjusting the position of light source support members 20*a* and 20*b* along the primary direction (y1 or y2 direction in FIG. 8) and secondary direction (perpendicular to the plane of sheet of the drawing) utilizing the allowance in diameter provided in a plurality through-holes, each having a diameter larger than that the bolts, and subsequently by clamp-tightening the bolts onto the light source support members 20*a* and 20*b*.

By means of such construction of the light source unit, the relative position of the light beams formed on the image forming member 13 by the light beam scanning systems of FIGS. 2 and 3 can also be adjusted to be within a predetermined range.

Incidentally, although the noted fixing steps in the present embodiment are carried out by the light source support members 20*a* and 20*b* formed so as to be displaceable along the direction perpendicular to the optical axes La and Lb during the adjustment of the LEDs 1*a* and 1*b* with respect to the axes La and Lb, and by adjusting the position during clamp-tightening the bolts; this adjustment in position may alternatively be carried out with a fixture provided, which is displaceable with relative ease in two directions, y1 or y2 direction and perpendicular to the plane of the drawing of FIG. 8.

Furthermore, the noted fixing may alternatively be carried out using a plurality of adjusting screws, the construction will be more complex than the present embodiment.

Also, by means of such construction of present embodiment, the tilting of the lens holders for holding the coupling lens, which is possibly caused individually by the change in ambient conditions, can be avoided.

In addition, even if the lens holder 15 is tilted by any chance, the two coupling lenses 2*a* and 2*b* supported by the lens holder 15, are tilted by the same amount in the same direction. As a result, the variation of the relative position of the light beams can be obviated.

In addition, a further structure of the light beam scanning system is utilized in the present embodiment as shown in FIG. 8, in which, without using the beam synthesis prism 5, two light beams are brought to come across on the mirror face of the scanner 9 so as to carry out beam synthesis and subsequent scanning.

Also, the directions of optical axis and primary scanning for respective beams are defined as shown in FIG. 8 to be (x1, y1) and (x2, y2), and the secondary scanning directions for respective beams are both perpendicular to the plane of sheet of the drawing.

Therefore, the supporting faces in the present embodiment are arranged to be symmetric to one another with respect to the secondary scanning plane (i.e., the plane perpendicular to the optical axis and secondary scanning direction) in a manner similar to the first embodiment.

As a result, the variation in relative position of beam images formed on the image forming member by the light beam scanning system of FIG. can also be reduced.

The lens holders 3*a* and 3*b* are provided independently separately from each other in the previous first and second embodiments, and the adjustment of the lens holders 3*a* and 3*b* with respect to the optical axes La and Lb during fixing steps are rather complicated.

In the construction in the present embodiment, however, the lens holder 15 is formed incorporating these two holders integrally. Therefore, the adjustment is achieved by fixing one lens holder 15 onto the predetermined position and the adjustment steps can considerably be simplified.

Figure 17:
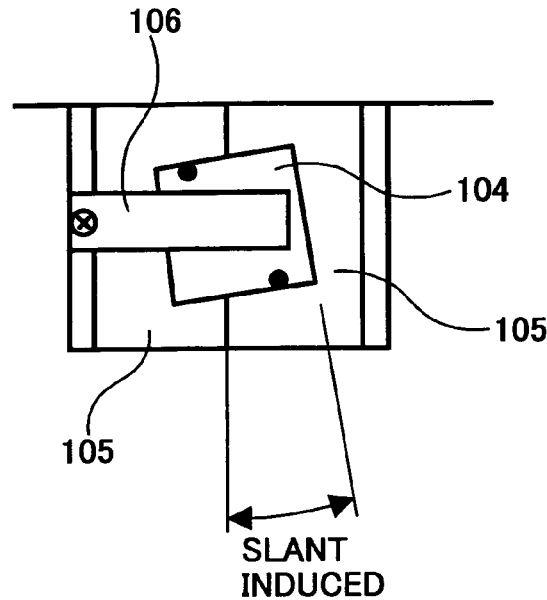
FIG. 17 shows a portion of FIG. 15 viewed from the B direction in the drawing.

In addition, lubricating properties of the supporting faces 6*a*, 7*a*, 6*b* and 7*b*, can be improved with respect to coupling lenses 2*a* and 2*b* by providing surface treatment onto these faces with, for example, Teflon® resinous materials. As a result, since the coupling lenses 2*a* and 2*b* can be securely supported linearly and smoothly against two supporting faces in stead of the support by points as shown in FIG. 17, the earlier noted difficulty ② in surface contact or slidable support is alleviated.

Also, in case where the lens holder 15 is formed of aluminum, the hardness of the supporting faces 6*a*, 7*a*, 6*b* and 7*b* can be increased by alumite coating. With the thus formed hard surface the coupling lenses 2*a* and 2*b* can be securely supported linearly and smoothly against two supporting faces in stead of the support by points as shown in FIG. 17, and the difficulty ② in surface contact is alleviated.

Furthermore, in case where the lens holder 15 is formed of iron or its alloy, the hardness of the supporting faces 6*a*, 7*a*, 6*b* and 7*b* can be increased by tempering processing. With the thus formed hard surface the coupling lenses 2*a* and 2b are securely supported linearly and smoothly against two supporting faces in stead of the support by points as shown in FIG. 17, and the difficulty ② in surface contact can be alleviated.

Although the details are abbreviated herein, other components are utilized also in the present embodiment to be adapted to function in a similar manner to those in the first and second embodiments described earlier.

Figure 9:
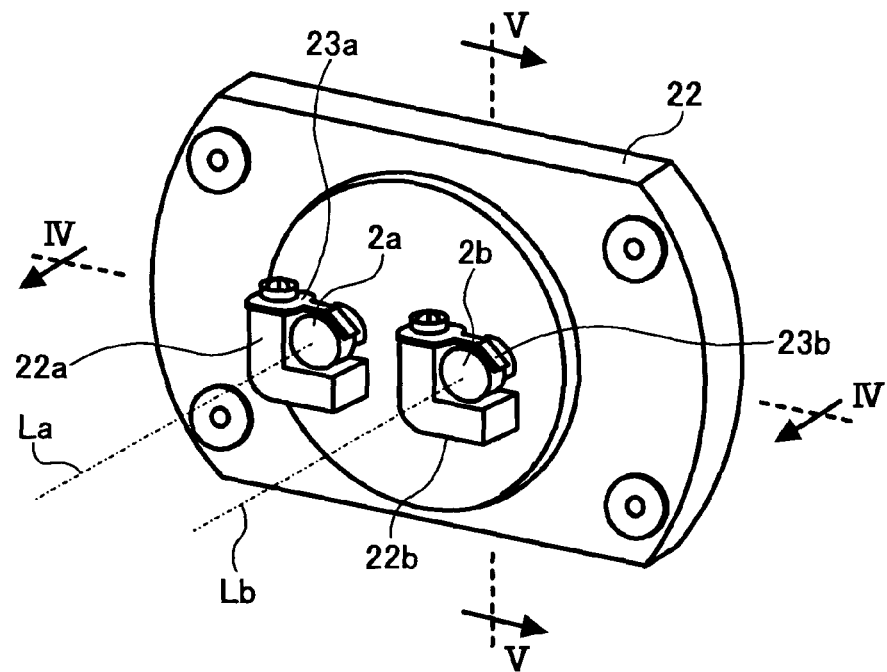
FIG. 9 is a frontal perspective view of the light source unit according to a fourth embodiment disclosed herein.
Figure 10:
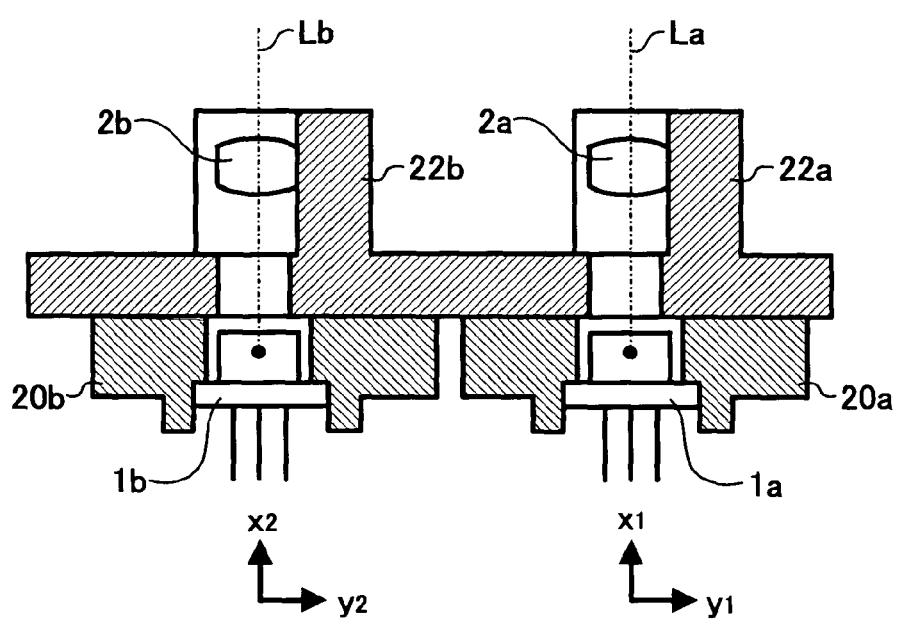
FIG. 10 is a cross-sectional view taken along the line IV-IV of the structure of FIG. 9.
Figure 11:
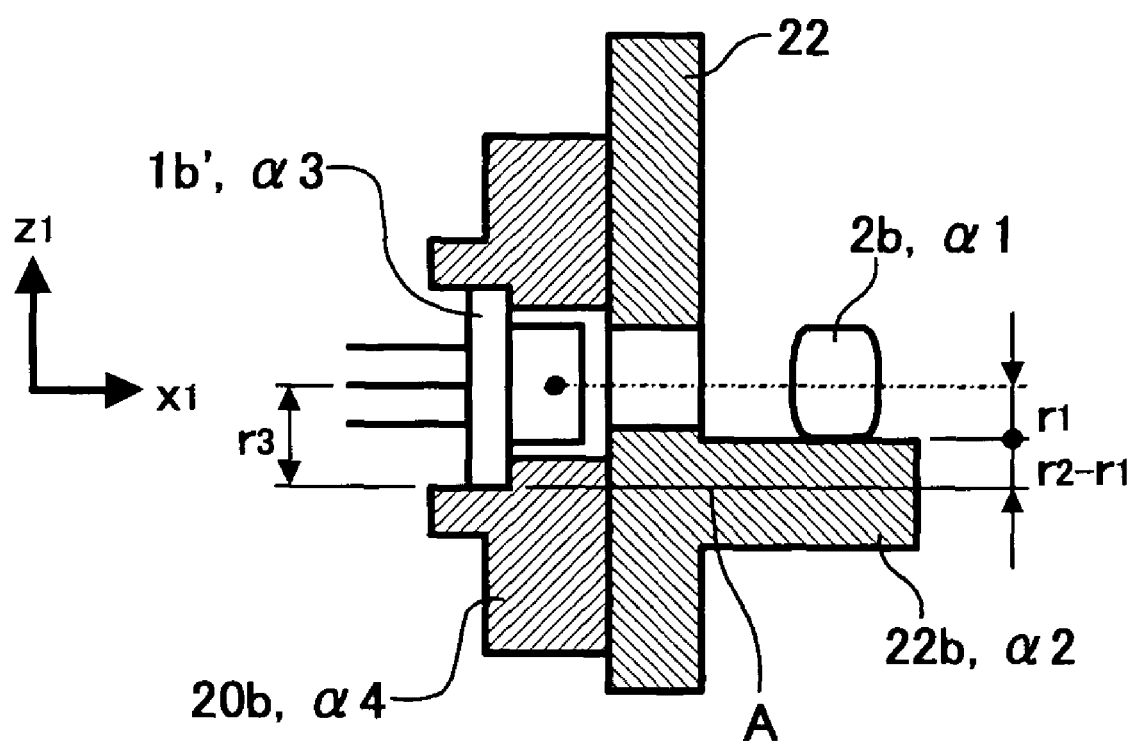
FIG. 11 is a cross-sectional view taken along the line V-V of the structure of FIG. 9.

FIGS. 9 through 11 are prepared to illustrate the basic structure of the light source unit according to a fourth embodiment disclosed herein, in which FIG. 9 is a frontal perspective view, FIG. 10 is a cross-sectional view taken along the line IV-IV in FIG. 9, and FIG. 11 is a cross-sectional view taken along the line V-V, of the structure of FIG. 9.

The light source unit in the present embodiment shown in FIG. 9 is formed by placing frontally L-shaped lens holders, 22a and 22b, integrally in protruded manner on a lens holder 22 and subsequently by elastically abutting the coupling lenses 2a and 2b against the supporting faces 6a and 7a, and 6b and 7b of the lens holders 22a and 22b by springs 23a and 23b, respectively.

The thus formed light source unit therefore assumes the shape of the first embodiment with the exception that the previous lens holders 3a and 3b are now formed integrally on one single plane in the protruded manner.

In addition, the supporting faces 6a and 7a, and 6b and 7b are arranged such that the faces 7a and 7b are parallel to the primary scanning direction, and the faces and 6a and 6b parallel to the secondary scanning direction.

Furthermore, the first and second LEDs 1a and 1b are fixed onto light source support members 20a and 20b through press fitting into fitting holes provided on the support members 20a and 20b in a similar manner to the third embodiment.

Incidentally, although the springs 23a and 23b, for pressing the coupling lenses 2a and 2b, are each formed herein above in overhung type, they are alternatively formed by fixing at the both ends of respective lens holders 22a and 22b.

Although the details are abbreviated herein, other components are utilized also in the present embodiment to be adapted to function in a similar manner to those in the first through third embodiments described earlier.

The effects of thermal expansion on the light source unit and light beam scanning system will be detailed herein below taking the present embodiment as an example.

The coefficients of linear thermal expansion are given as $\alpha 3$ for package portions $1a'$ and $1b'$ of LEDs $1a$ and $1b$ (FIG. 11), $\alpha 1$ for coupling lenses 2a and 2b, $\alpha 2$ for lens holders 22a and 22b, and $\alpha 4$ for light source support members 20a and 20b, respectively.

If the relation $\alpha 1 = \alpha 2 = \alpha 3 = \alpha 4$ holds, the difficulty such as the deviation in relative position between the light emitting point LEC and optical axis of collimator lens L, which described earlier as the difficulty ①, does not arise.

In general purpose products, however, the package portions $1a'$ and $1b'$ of LEDs $1a$ and $1b$, respectively, are often made of iron alloy materials, and the kind of materials for forming the coupling lenses 2a and 2b is rather limited so long as optical properties is of primary importance. Therefore, it is difficult to satisfy the relation $\alpha 3 = \alpha 1$.

Accordingly, in case of $\alpha 1 \leq \alpha 3$, in which the material for forming the coupling lenses 2a and 2b is glass, the coefficients of linear thermal expansion, $\alpha 2$ and $\alpha 4$, are preferably adjusted to satisfy the relations $\alpha 1 \leq \alpha 2 \leq \alpha 3$ and $\alpha 1 \leq \alpha 4 \leq \alpha 3$.

In contrast, in case of $\alpha 3 < \alpha 1$, in which the material for forming the coupling lenses 2a and 2b is resinous materials, the coefficients, $\alpha 2$ and $\alpha 4$, are preferably adjusted to satisfy the relations $\alpha 3 \leq \alpha 2 \leq \alpha 1$ and $\alpha 3 \leq \alpha 4 \leq \alpha 1$.

That is, in the case where the coupling lenses 2a and 2b are formed of glass, it is preferable to choose the materials for forming the lens holders 22a and 22b and the light source support members 20a and 20b to have coefficients of linear thermal expansion of the magnitude between those of the package portions $1a'$ and $1b'$ and the coupling lenses 2a and 2b.

By choosing such materials, therefore, the deviation in relative position can be reduced between the light emitting points SEC and the optical axes La and Lb of the coupling lenses 2a and 2b, in the secondary scanning direction (z1). As a result, the deviation in relative position between the optical axes La and Lb, shown in FIG. 9, can be reduced along the secondary scanning direction.

In addition, the coefficient of linear thermal expansion of the springs is brought to be the same as that of the lens holder 22, the difficulty ③ noted earlier with reference to FIG. 18 can be obviated. As a result, the deviation in relative position between the optical axes La and Lb can be further reduced.

Furthermore, on the assumption that the lens holders 22a and 22b and the light source support members 20a and 20b are formed of the same material ($\alpha 2 = \alpha 4$), and that the change in ambient temperature is +40K, the positional variation of the light emitting point in the secondary scanning direction (z1) with respect to a datum point A is expressed as $$r3 \times \alpha 3 \times 40.$$

On the other hand, the positional variation of the optical axes La and Lb of the coupling lenses 2a and 2b in the secondary scanning direction (z1) is given by $$r1 \times \alpha 1 \times 40 + (r3 - r1) \times \alpha 2 \times 40.$$

Accordingly, if $\alpha 1$, $\alpha 2$, $\alpha 3$, r1 and r2 are determined to satisfy the relation $$|\alpha 3 \times r3 - \{\alpha 1 \times r1 + \alpha 2 \times (r3 - r1)\}| \times 40 \leq 1 \times 10^{-3} \text{ (mm/K)},$$

the variation in relative position between the light emitting points SEC and the optical axes La and Lb of the coupling lenses 2a and 2b in the secondary scanning direction (z1) can be reduced to be equal to, or less than 1 μm.

As a result, the deviation in relative position between optical axes La and Lb, shown in FIG. 9, can be reduced along the secondary scanning direction.

Incidentally, the dot-pitch is 21 μm in general for optical scanning apparatus with 600 dpi writing density. It may be noted the possible variation in the relative position along the secondary scanning direction along the secondary scanning direction is at most 1 μm under the above mentioned conditions related to thermal expansion coefficients for the adjustments of the parameters $\alpha 1$, $\alpha 2$, $\alpha 3$, r1 and r2, the noted positional variation is reduced to the magnitude of as small as 5% of the dot-pitch, which is hardly recognized by ordinary eyes. Therefore, the positional variation is hardly recognized also for optical scanning apparatuses with 1200 or 2400 dpi writing density.

In addition, since the positional variation of the order of from 10 to 15 μm can be recognized by only very few with eyes for reasons of the eyesight characteristics, almost none of the positional variation is perceived as the worsening in picture image quality so long as the variation is equal to, or less than 50% of the dot-pitch.

The above noted method of FIG. 11 for determining the coefficients of linear thermal expansion may also be adapted to the direction along the primary scanning (FIG. 10), and the deviation in relative position between the optical axes, La and Lb, shown in FIG. 9, can be reduced in the primary scanning direction.

Although the shape of coupling lenses 2a and 2b has been assumed to be cylindrical herein above in the present discussion, other shapes may also be applied.

In addition, although the number of light beams has been taken as two, other numbers of light beams may also be adapted. For example, the above noted LEDs 1a and 1b may each have plural light emitting points within the package. For example, a multiple-beam LED array can be formed by constituting a source unit with two LEDs and subsequently juxtaposing a plurality of the source units.

To be more specific, by further incorporating two additional light source units similar to those shown in FIG. 9, the resulting four units are arranged vertically and combined mechanically to thereby form one single unit. Subsequently, four light beams emanated from the resultant unit may be synthesized by a prism.

Furthermore, two of the thus formed four-light-beam LED units may be combined to form one eight-beam source, the thus formed eight-beam units may be combined to form one sixteen-beam source and so on.

Incidentally, this method of constituting the light source may also be applied to the light unit of FIG. 5.

By means of the present method, in which the four-beam unit is formed of two double-beam units in place of four single-beam units, manufacturing costs can be decreased considerably and design flexibility can be largely enhanced since the designing process can be achieved by setting the number of light beams according to designing conditions with relative ease.

Figure 12:
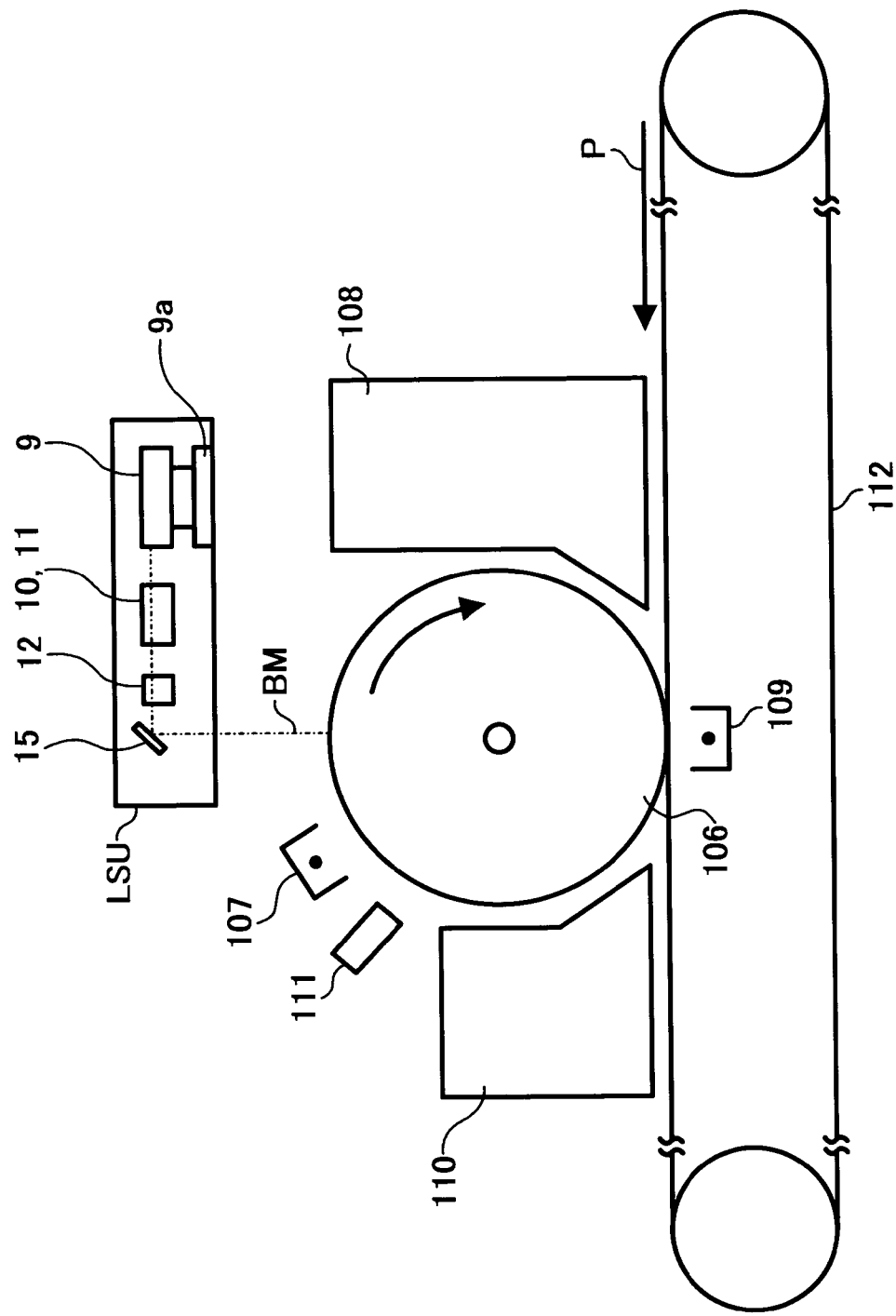
FIG. 12 illustrates the basic structure of an image forming apparatus according to a fifth embodiment disclosed herein.

FIG. 12 illustrates the basic structure of an image forming apparatus according to a fifth embodiment disclosed herein. The light source units described earlier in the first through fourth embodiments can suitably be utilized as the light scanning units to be incorporated into electrophotographic image forming apparatuses and similar other apparatuses.

Referring to FIG. 12, a light scanning unit LSU as an optical unit consists of the optical unit LSN aforementioned in reference to FIGS. 2 and 3.

Namely, the light scanning unit LSU includes at least an LED which is directly on-off modulated according to the data to be duplicated, a coupling lens (not shown) for collimating the light beams BM emanated from the LED (laser beams), a cylindrical lens for focusing the laser beams to form a line image in the vertical scanning direction, a polygonal mirror 9 for receiving and subsequently deflecting the laser beams incident from the cylindrical lens, a polygon motor 9a for driving to rotate the polygonal mirror at a high speed, f-θ lenses 10 and 11 for converting the beam scanning from constant angular velocity mode to constant linear velocity, a BTL lens 12, and a mirror 115.

By means of the thus formed light scanning unit LSU, the light beams BM emanated from the LED are collimated by the coupling lens (not shown) to form parallel beams, transmitted through the cylindrical lens, deflected by the polygonal mirror 9, transmitted further through the f-θ lenses 10 and 11 and the BTL lens 12, reflected by a mirror 115, and scanned over the surface of a photoreceptor 106.

The BTL is an abridgement of barrel toroidal lens, and it operates to focus the light beams (condensing and correcting the position in the vertical scanning direction).

There provided on the periphery of the photoreceptor 106 are a charging unit 107, developing unit 108, transfer unit 109, cleaning unit 110, and discharging unit 111, which altogether constitute a image forming means to operate as a image forming system.

According to known electrophotographic process steps of charging, light exposing and developing, electrostatic latent images on the surface of the photoreceptor 101 are then rendered visible as toner images, the toner images are subsequently transferred by the transfer unit 109 onto a copy sheet P which is conveyed by a sheet conveyor belt 112, and permanently fixed by a fixing unit (not shown).

The thus formed image forming apparatus may suitably incorporate the light source units described earlier in the first through fourth embodiments to be utilized as the light scanning units. By carrying out image forming steps onto an image bearing member (photoreceptor 106) with a plurality light beams with the construction of the light scanning unit disclosed herein, the deviation in relative position between the plural light beams can be reduced. As a result, output images can be obtained having excellent picture image qualities.

Figure 13:
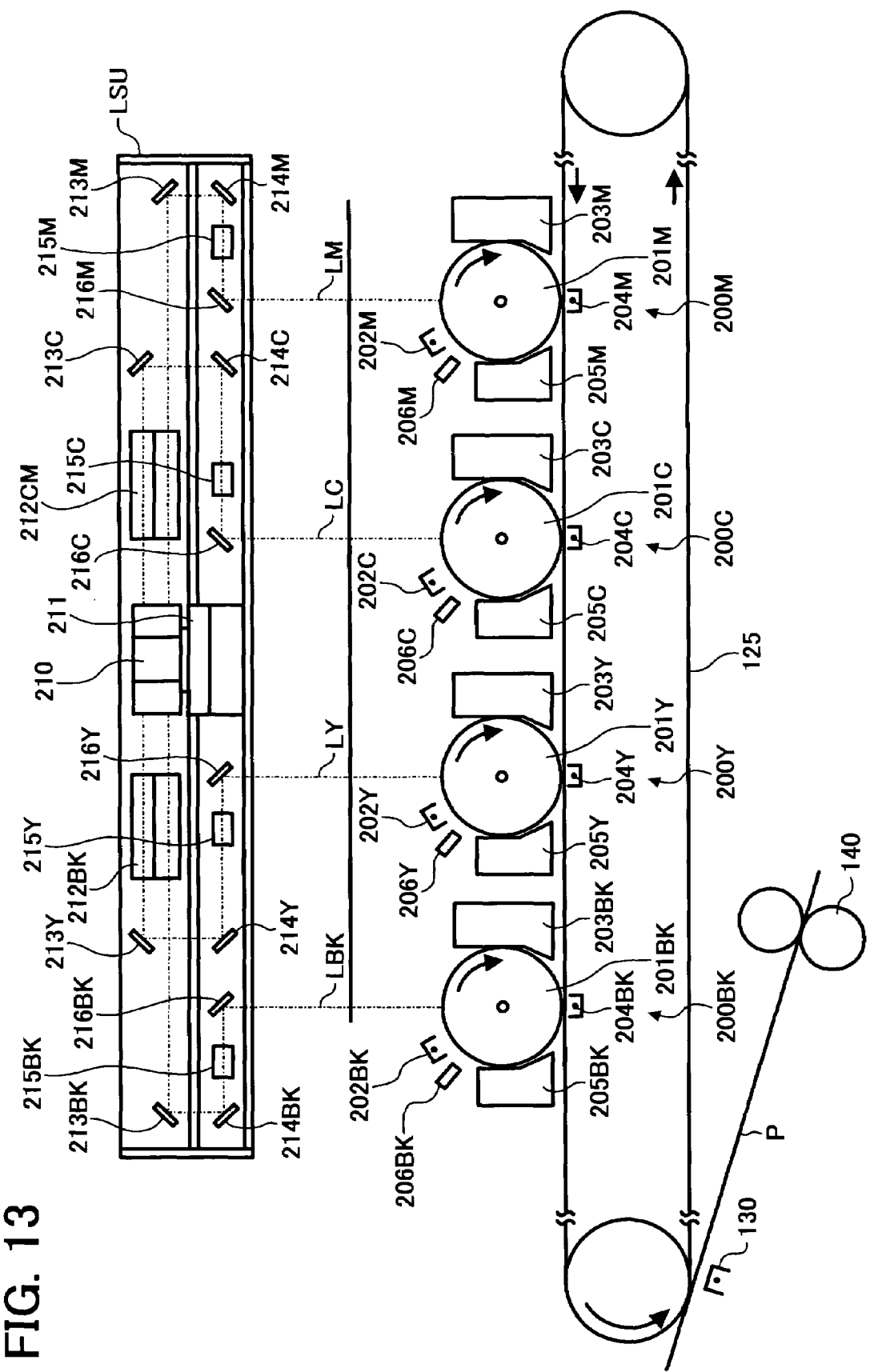
FIG. 13 illustrates the mechanical construction of the color image forming apparatus of quadruple tandem-type according to a sixth embodiment disclosed herein.

FIG. 13 illustrates the mechanical construction of the color image forming apparatus of quadruple tandem-type according to a sixth embodiment disclosed herein.

Referring to FIG. 13, in order to form color picture images resulting from the superposition of color images in four colors (black, yellow, cyan and magenta), the quadruple tandem-type color image forming apparatus is provided with several units such as four sets of image forming stations 200BK, 200Y, 200C and 200M and a light scanning unit LSU.

In the image forming stations 200BK, 200Y, 200C and 200M for respective colors, there included on the periphery of the photoreceptors 201BK, 201Y, 201C and 201M are charging units 202BK, 202Y, 202C and 202M, developing units 203BK, 203Y, 203C and 203M, transfer units 204BK, 204Y, 204C and 204M, cleaning units 205BK, 205Y, 205C and 205M, and discharging units 206BK, 206Y, 206C and 206M, respectively.

According to known electrophotographic process steps of charging, light exposing and developing, picture images are formed on a copy sheet P.

Namely, each of the image stations carries out the visible image formation with toners of respective colors, and at the instance when the sheet P is conveyed by a conveying belt B to reach the exact location, the image of the first color is transferred.

Similarly, the images of the second, third and fourth colors are respectively transferred in a superposed manner, to thereby form the picture image in full color. The copy sheet P is then permanently fixed by a fixing unit (not shown).

The light scanning unit LSU disclosed herein is designed for deflecting and scanning light beams of different colors (as shown in FIG. 13) by using one single polygonal mirror 210 utilizing separately the upper and lower portions of the polygonal mirror 210 (e.g., the upper portion for Y and C beams and lower portion for BK and M beams) and further by directing the light beams to two approximately opposite directions (e.g., BK and Y beams to one direction, and C and M beams to the other), and then achieving the beam scanning on the surfaces of the photoreceptors 201BK, 201Y, 201C and 201M.

Namely, the laser beams of different colors LBK, LY, LC and LM are deflected by the polygonal mirror 210, transmitted through f-θ lenses 212YBK and 212CM, reflected by first mirrors 213BK, 213Y, 213C and 213M, and also by second mirrors 214BK, 214Y, 214C and 214M, transmitted through BTLs 215BK, 215Y, 215C and 215M, reflected by third mirrors 216BK, 216Y, 216C and 216M, and subsequently brought to carry out the beam scanning over the prescribed surface of photoreceptors 201BK, 201Y, 201C and 201M.

Figure 14:
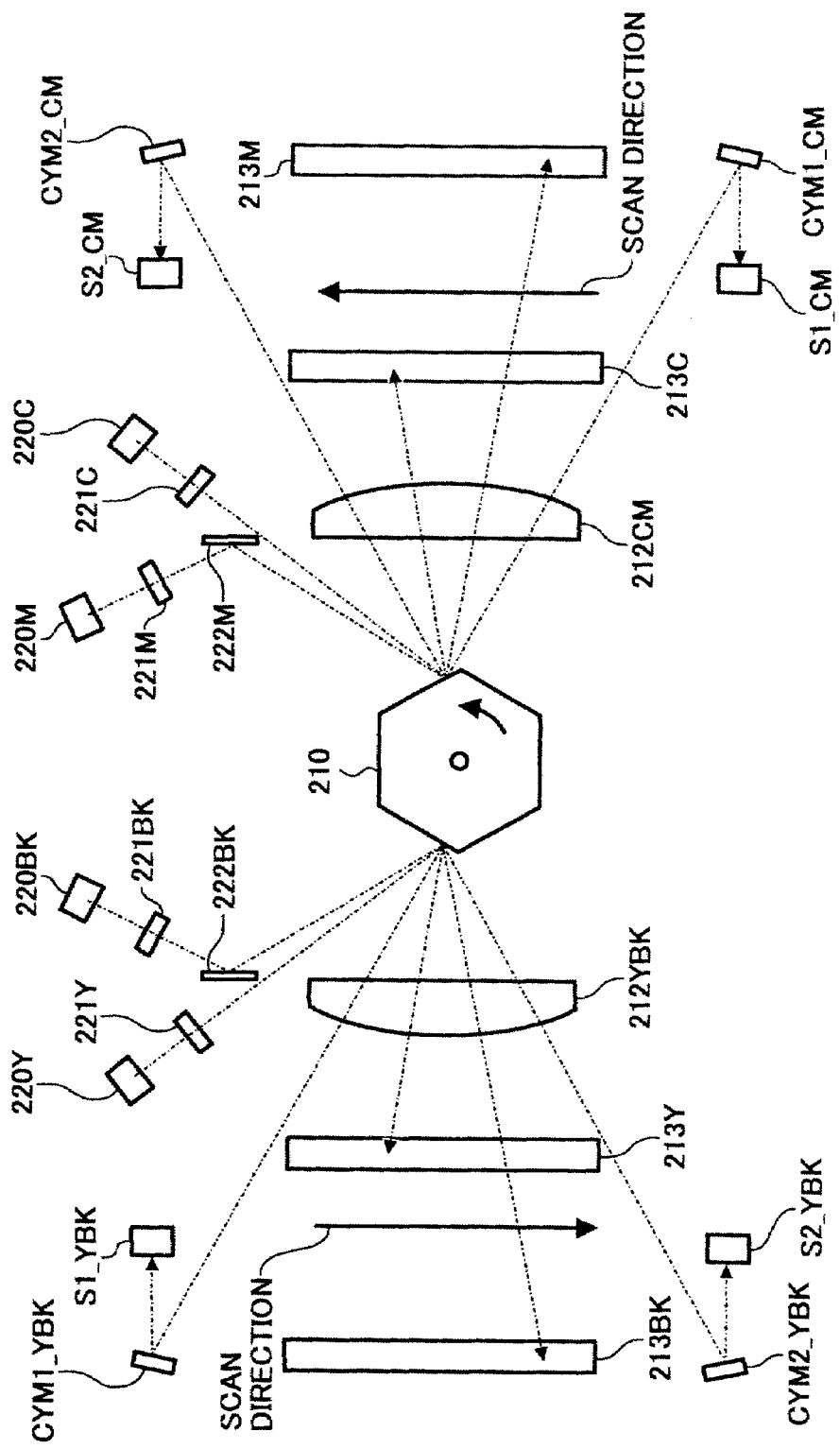
FIG. 14 is a top view illustrating the overall construction of the light scanning unit LSU of FIG. 13.

FIG. 14 is a top view illustrating the overall construction of the light scanning unit LSU of FIG. 13.

Laser beams LBK and LM, emanated from LD units 220BK for the BK color and M color, respectively, are transmitted through the cylindrical lens (which are hereinafter referred to as CYLs) 221BK and 221M, brought to be incident onto the lower reflective plane portion of the polygonal mirror 210 by way of reflecting mirrors 222BK and 222M, deflected by the rotation of the polygonal mirror 210, transmitted through f-θ lenses 212YBK and 212M, and reflected by first mirrors 213BK and 213M.

Also, laser beams LC and LY, emanated from LD units 220C for the C color and Y color, respectively, are transmitted through the cylindrical lens 221C and 221Y, brought to be incident onto the upper reflective plane portion of the polygonal mirror 210 by way of reflecting mirrors 222C and 222Y, deflected by the rotation of the polygonal mirror 210, transmitted through f-θ lenses 212C and 212Y, and reflected by first mirrors 213C and 213Y.

There included additionally in the present embodiment are first cylindrical mirrors (which are hereinafter referred to as CYM1s) CYM1_YBK and CYM1_CM, second cylindrical mirrors (as CYM2s) CYM2_YBK and CYM2_CM, first sensors (as S1) S1_YBK and S1_CM, second cylindrical mirrors (as CYM2s) S2_YBK and S2_CM.

By the thus provided CYM1_YBK, CYM1_CM, CYM2_YBK and CYM2_CM, the laser beams transmitted through the f-θ lenses 212YBK and 212CM are reflected and converged to be incident onto S1_YBK, S1_CM, S2_YBK and S2_CM, respectively.

The first sensors S1_YBK and S1_CM also serve as synchronization detecting sensors to detect laser beam synchronization signals. In addition, the laser beams LY from LD unit 220Y and LBK from 220BK are designed to utilize in common CYM1_YBK, CYM2_YBK, S1_YBK and S2_YBK.

Similarly, the laser beams LC from LD unit 220C and LM from 220M are designed to utilize in common CYM1_CM, CYM2_CM, S1_CM and S2_CM Since two kinds of laser beams are thus incident into one single sensor, the timing of the incidence is designed to differ from one another so as to detect the beams separately.

However, two sensors for each beam may alternatively be provided to carry out the detection.

It may be added the laser beams LY and LBK are subjected to scanning in the direction opposite to that of the beams LC and LM as shown in FIG. 14.

In the case described above in reference to FIGS. 13 and 14, picture images are written using one beam for each photoreceptor.

Alternatively, for example, by writing into the C photoreceptor using a first beam BMa and into the M photoreceptor using a second beam BMb, respectively, the variation caused by the change in ambient conditions in relative position between laser beams C(cyan) and M (magenta) colors can be reduced.

As a result, the shear in printing, for example, between cyan and magenta is reduced and images can be formed with excellent color picture qualities.

The apparatuses and process steps set forth in the present description may therefore be implemented using suitable host computers and terminals incorporating appropriate processors programmed according to the teachings disclosed herein, as will be appreciated to those skilled in the relevant arts.

Therefore, the present disclosure also includes a computer-based product which may be hosted on a storage medium and include instructions which can be used to program a processor to perform a process in accordance with the present disclosure. The storage medium can include, but is not limited to, any type of disk including floppy disks, optical disks, CD-ROMS, magneto-optical disks, ROMs, RAMs, EPROMs, EEPROMS, flash memory, magnetic or optical cards, or any type of media suitable for storing electronic instructions.

It is apparent from the above description that the light source and light beam scanning unit disclosed herein have advantages over previous similar devices.

For example, in the light source unit for emanating light beams, which includes a plurality LEDs and coupling lenses each corresponding to the LEDs, there are provided lens holders having two supporting faces aligned approximately parallel to the optical axes of the coupling lenses, elastic members for abutting the coupling lenses by pressing the side portions thereof onto the supporting faces, light source support members for holding LEDs corresponding to the coupling lenses, and bolts for fixing the light source support members.

Since the light source support members is fixed onto lens holder by bolts following the proper adjustment of the position of the lens holder in the vertical direction with respect to the optical axes of the coupling lenses $2a$ and $2b$, the light source and beam scanning units can be formed having high-precision and low costs, and reduced deviation with time and under changing ambient conditions.

In addition, a plurality of the thus formed light source and beam scanning units can be arranged in row, which enables a plurality of light beams be scanned simultaneously to be incorporated into image forming apparatus and other similar systems.

The image forming apparatus can therefore be formed by suitably incorporating the light source units disclosed herein, in which the deviation in relative position between the plural light beams is reduced and output images can be obtained having excellent picture image qualities.

In addition, the color image forming apparatus can be provided by suitably incorporating the light source and beam scanning units disclosed herein, in which the deviation in relative position between the plural light beams of respective colors is reduced, excellent color picture qualities can be obtained with reduced shear in printing for the respective printed colors.

Additional modifications and variations of the present invention are possible in light of the above teachings. It is therefore to be understood that within the scope of the appended claims, the invention may be practiced otherwise than as specifically described herein.

This document claims priority and contains subject matter related to Japanese Patent Application No. 2002-273804, filed with the Japanese Patent Office on Sep. 19, 2002, the entire contents of which are hereby incorporated by reference.

What is claimed as new and desired to be secured by Letters Patent of the United States is:

1. A light source unit for emanating light beams, comprising:

a plurality of light sources;
a plurality of coupling lenses each corresponding to a light source of said plurality of light sources;
a coupling lens holding unit having a first and a second holding faces aligned approximately in parallel to an optical axis of a first coupling lens of said plurality of coupling lenses;
an elastically pressing member pressing a side portion of said first coupling lens against said first and said second holding faces so as to thereby hold said first coupling lens;
a light source holding unit holding a first light source of the plurality of light sources corresponding to said first coupling lens; and
a fixing member fixing said light source holding unit,
wherein said fixing member fixes a position of said first light source displaceable over a plane perpendicular to said optical axis of said first coupling lens, and
wherein at least one of said first coupling lens and said holding face is provided with a lubricating means at a location in contact there between.

2. A light source unit for emanating light beams, comprising:
a plurality of light sources;
a plurality of coupling lenses each corresponding to a light source of said plurality of light sources;
a coupling lens holding unit having a first and a second holding faces aligned approximately in parallel to an optical axis of a first coupling lens of said plurality of coupling lenses;
an elastically pressing member pressing a side portion of said first coupling lens against said first and said second holding faces so as to thereby hold said first coupling lens;
a light source holding unit holding a first light source of the plurality of light sources corresponding to said first coupling lens; and
a fixing member fixing said light source holding unit,
wherein said fixing member fixes a position of said first light source displaceable over a plane perpendicular to said optical axis of said first coupling lens, and
wherein a portion of said first coupling lens in contact with said holding face is subjected to surface hardening.

3. The light source unit according to claims 1 or 2, wherein a supporting unit is formed, as one set, consisting of said first and second holding faces aligned approximately in parallel to said optical axis of said first coupling lens for holding said first coupling lens, and at least two sets of said supporting unit are formed integrally as one component.

4. The light source unit according to claims 1 or 2, wherein a supporting unit is formed, as one set, consisting of said first and second holding faces aligned approximately in parallel to said optical axis of said first coupling lens for holding said first coupling lens, and at least two sets of said supporting unit are arranged such that a direction of said at least two sets, in terms of a direction of said optical axis, a primary scanning direction and a secondary scanning direction, is identical to each other.

5. The light source unit according to claims 1 or 2, wherein a supporting unit is formed, as one set, consisting of said first and second holding faces aligned approximately in parallel to said optical axis of said first coupling lens for holding said first coupling lens, and at least two sets of said supporting unit are arranged such that a direction of said at least two sets, in terms of a direction of said optical axis, a primary scanning direction and a secondary scanning direction, is symmetrical to each other.

6. A light source unit for emanating light beams, comprising:
a plurality of light sources;
a plurality of coupling lenses each corresponding to a light source of said plurality of light sources;
a coupling lens holding unit having a first and a second holding faces aligned approximately in parallel to an optical axis of a first coupling lens of said plurality of coupling lenses; and
an elastically pressing member pressing a side portion of said first coupling lens against said first and said second holding faces so as to thereby hold said first coupling lens,
wherein at least one of said first coupling lens and said holding face is provided with a lubricating means at a location in contact there between.

7. A light source unit for emanating light beams, comprising:
a plurality of light sources;
a plurality of coupling lenses each corresponding to a light source of said plurality of light sources;
a coupling lens holding unit having a first and a second holding faces aligned approximately in parallel to an optical axis of a first coupling lens of said plurality of coupling lenses; and
an elastically pressing member pressing a side portion of said first coupling lens against said first and said second holding faces so as to thereby hold said first coupling lens,
wherein a portion of said first coupling lens in contact with said holding face is subjected to surface hardening.

8. The light source unit according to claims 6 or 7,
wherein said elastically pressing member is formed of planar elastic material, and
wherein ends of said elastically pressing member are fixed to said coupling lens holding unit so as to hold in between said ends said portion of said first coupling lens in contact with said holding faces.

9. The light source unit according to claim 8, wherein said ends of said elastically pressing member are fixed approximately symmetric with respect to said portion of said first coupling lens in contact with said holding face.

10. The light source unit according to claims 6 or 7, wherein a supporting unit is formed, as one set, consisting of said first and second holding faces aligned approximately in parallel to said optical axis of said first coupling lens for holding said first coupling lens, and at least two sets of said supporting unit are formed integrally as one component.

11. A light source unit for emanating light beams, comprising:
a plurality of light sources;
a plurality of coupling lenses each corresponding to a light source of said plurality of light sources;
a coupling lens holding unit having a first and a second holding faces aligned approximately in parallel to an optical axis of a first coupling lens of said plurality of coupling lenses; and
an elastically pressing member pressing a side portion of said first coupling lens against said first and said second holding faces so as to thereby hold said first coupling lens, wherein said elastically pressing member is formed of planar elastic material, and wherein ends of said elastically pressing member are fixed to said coupling lens holding unit so as to hold in between said ends said portion of said first coupling lens in contact with said holding faces, wherein said elastically pressing member has a coefficient of linear expansion approximately equal to that of a material of said coupling lens holding unit.

12. A light source unit for emanating light beams, comprising:
a plurality of light sources;
a plurality of coupling lenses each corresponding to a light source of said plurality of light sources;
a coupling lens holding unit having a first and a second holding faces aligned approximately in parallel to an optical axis of a first coupling lens of said plurality of coupling lenses; and
an elastically pressing member pressing a side portion of said first coupling lens against said first and said second holding faces so as to thereby hold said first coupling lens,
further comprising:
a light source holding unit holding a first light source of said plurality of light sources attached to said coupling lens holding unit, said first light source corresponding to said first coupling lens,
wherein said coupling lens holding unit, a package unit of a semiconductor laser diode, and said light source holding unit are formed of materials which are selected to satisfy the following relationships:

$$\alpha 1 \leq \alpha 3, \alpha 1 \leq \alpha 2 \leq \alpha 3 \text{ and } \alpha 1 \leq \alpha 4 \leq \alpha 3,$$

where $\alpha 1 (1/K)$, $\alpha 2 (1/K)$, $\alpha 3 (1/K)$ and $\alpha 4 (1/K)$ are coefficients of linear thermal expansion of said first coupling lens, said coupling lens holding unit, said package unit and said light source holding unit, respectively.

13. A light source unit for emanating light beams, comprising:
a plurality of light sources;
a plurality of coupling lenses each corresponding to a light source of said plurality of light sources;
a coupling lens holding unit having a first and a second holding faces aligned approximately in parallel to an optical axis of a first coupling lens of said plurality of coupling lenses; and
an elastically pressing member pressing a side portion of said first coupling lens against said first and said second holding faces so as to thereby hold said first coupling lens,
further comprising:
a light source holding unit attached to said coupling lens holding unit for holding a first light source of said plurality of light sources corresponding to said first coupling lens,
wherein said coupling lens holding unit, a package unit of a semiconductor laser diode, and said light source holding unit are formed of materials which are selected to satisfy the following relationships:

$$\alpha 3 < \alpha 1, \alpha 3 \leq \alpha 2 \leq \alpha 1 \text{ and } \alpha 3 \leq \alpha 4 \leq \alpha 1,$$

where $\alpha 1 (1/K)$, $\alpha 2 (1/K)$, $\alpha 3 (1/K)$ and $\alpha 4 (1/K)$ are coefficients of linear thermal expansion of said first coupling lens, said coupling lens holding unit, said package unit and said light source holding unit, respectively.

14. A light beam scanning unit, comprising:
a light source unit for emanating light beams, comprising:
a plurality of light sources;
a plurality of coupling lenses each corresponding to a light source of said plurality of light sources;
a coupling lens holding unit having a first and a second holding faces aligned approximately in parallel to an optical axis of a first coupling lens of said plurality of coupling lenses; and
an elastically pressing member pressing a side portion of said first coupling lens against said first and said second holding faces so as to thereby hold said first coupling lens;
a light source holding unit attached to said coupling lens holding unit for holding a first light source of said plurality of light sources corresponding to said first coupling lens;
a light beam deflection unit adapted to receive and subsequently deflect light beams emanated from said light source unit; and
an optics system adapted to focus the light beams onto a member to be scanned and scanning along a primary scanning direction,
wherein said first coupling lens, said coupling lens holding unit, a package unit of a semiconductor laser diode, and said light source holding unit are formed of materials which are selected in terms of coefficients of linear thermal expansion $\alpha 1$, $\alpha 2$, $\alpha 3$ and $\alpha 4$, and radii r1 and r3 are adjusted such that a positional deviation of the light beams on the member to be scanned is controlled to be equal to, or smaller than 50% of a dot pitch of the light beams, and
wherein $1\alpha (1/K)$, $\alpha 2 (1/K)$, $\alpha 3 (1/K)$ and $\alpha 4 (1/K)$ are coefficients of linear thermal expansion of said first coupling lens, said coupling lens holding unit, said package unit and said light source holding unit, respectively; r1 (mm) is a distance from said optical axis of said first coupling lens to a point of contact between said first coupling lens and said holding face; and r3 (mm) is an outer radius of said package unit.

15. The light beam scanning unit according to claim 14, wherein a plurality of light beams are scanned, the plurality of light beams each being emanated by a plurality of said light source units arranged in a row.

16. A light beam scanning unit, comprising:
a light source unit for emanating light beams, comprising:
a plurality of light sources;
a plurality of coupling lenses each corresponding to a light source of said plurality of light sources;
a coupling lens holding unit having a first and a second holding faces aligned approximately in parallel to an optical axis of a first coupling lens of said plurality of coupling lenses; and
an elastically pressing member pressing a side portion of said first coupling lens against said first and said second holding faces so as to thereby hold said first coupling lens;
a light source holding unit attached to said coupling lens holding unit for holding a first light source of said plurality of light sources corresponding to said first coupling lens,
a light beam deflection unit adapted to receive and subsequently deflect light beams emanated from said light source unit; and
an optics system adapted to focus the light beams onto a member to be scanned and scanning along a primary scanning direction,
wherein said first coupling lens, said coupling lens holding unit, a package unit of a semiconductor laser diode, and said light source holding unit are formed of materials which are selected in terms of coefficients of linear thermal expansion α1, α2, α3 and α4, and radii r1 and r3 are adjusted so as to satisfy the following relationships:

$$\alpha 2 = \alpha 4; \text{ and}$$

$$|\alpha 3 \times r3 - \{\alpha 1 \times r1 + \alpha 2 \times (r3 - r1)\}| \leq 2.5 \times 10^{-5} \text{ (mm/}K\text{)},$$

where α1(1/K), α2(1/K), α3(1/K) and α4(1/K) are coefficients of linear thermal expansion of said first coupling lens, said coupling lens holding unit, said package unit and said light source holding unit, respectively; r1 (mm) is a distance from said optical axis of said first coupling lens to a point of contact between said first coupling lens and said holding face; and r3 (mm) is an outer radius of said package unit.

17. The light beam scanning unit according to claim 16, wherein α3×r3−{α1 ×r1+α2+(r3−r1)}is equal to, or smaller than 1 μm at normal temperatures.

18. The light beam scanning unit according to claim 16, wherein a plurality of light beams are scanned simultaneously, the plurality of light beams each being emanated by a plurality of said light source units arranged in a row.

19. An image forming apparatus, comprising:
said light beam scanning unit recited in anyone of claims 14 through 18; and
an image forming unit for rendering an image visible, the image being written by said light beam scanning unit onto an image bearing member corresponding to input image data.

20. The image forming apparatus according to claim 19, wherein said light beam scanning unit and said image forming unit are provided for each color rendered visible by said image forming apparatus.

21. A light source unit for emanating light beams, comprising:
a plurality of light emitting means for emitting light;
a plurality of optical coupling means each corresponding to a light emitting of said plurality of light emitting;
an optical coupling holding means having a first and a second means for holding a first optical coupling means of said plurality of optical coupling means, said first and second means for holding being aligned approximately in parallel to an optical axis of said first optical coupling means;
an elastically pressing means for pressing a side portion of said first optical coupling means against said first and said second means for holding so as to hold said first optical coupling means;
a light source holding means for holding a first light emitting of said plurality of light source means corresponding to said first optical coupling means; and
a fixing means for fixing said light source holding means,
wherein said fixing means operates to fix a position of said first light emitting means displaceable over a plane perpendicular to said optical axis of said first optical coupling means, and
wherein at least one of said first optical coupling means and said first and second means for holding is provided with a lubricating means at a location in contact there between.

22. A light source unit for emanating light beams, comprising:
a plurality of light emitting means for emitting light;
a plurality of optical coupling means each corresponding to a light emitting means of said plurality of light emitting means;
an optical coupling holding means having a first and a second means for holding a first optical coupling means of said plurality of optical coupling means, said first and second means for holding being aligned approximately in parallel to an optical axis of said first optical coupling means;
an elastically pressing means for pressing a side portion of said first optical coupling means against said first and said second means for holding so as to hold said first optical coupling means;
a light source holding means for holding a first light emitting means of said plurality of light emitting means corresponding to said first optical coupling means; and
a fixing means for fixing said light source holding means,
wherein said fixing means operates to fix a position of said first light emitting means displaceable over a plane perpendicular to said optical axis of said first optical coupling means, and
wherein a portion of said first optical coupling means in contact with said first and second means for holding is subjected to surface hardening.

23. A light source unit according to claims 21 or 22,
wherein a supporting means is formed, as one set, consisting of said first and second means for holding aligned approximately parallel to said optical axis of said first optical coupling means for holding said first optical coupling means, and at least two sets of said supporting means are formed integrally as one component.

24. A light source unit according to claims 21 or 22,
wherein a supporting means is formed, as one set, consisting of said first and second means for holding aligned approximately in parallel to said optical axis of said first optical coupling means for holding said first optical coupling means, and at least two sets of said supporting means are arranged such that a direction of said at least two sets, in terms of a direction of said optical axis, a primary scanning direction and a secondary scanning direction, is identical to each other.

25. A light source unit according to claims 21 or 22,
wherein a supporting means is formed, as one set, consisting of said first and second means for holding aligned approximately in parallel to said optical axis of said first optical coupling means for holding said first optical coupling means, and at least two sets of said supporting means are arranged such that a direction of said at least two sets, in terms of a direction of said optical axis, a primary scanning direction and a secondary scanning direction, is symmetrical to each other.

26. A light source unit for emanating light beams, comprising:
a plurality of light emitting means for emitting light;
a plurality of optical coupling means each corresponding to a light emitting means of said plurality of light emitting means;
an optical coupling holding means having a first and a second means for holding a first optical coupling means of said plurality of optical coupling means, said first and second means for holding being aligned approximately in parallel to an optical axis of said first optical coupling means; and an elastically pressing means for pressing a side portion of said first optical coupling means against said first and said second means for holding so as to hold said first optical coupling means, wherein at least one of said first optical coupling means and said first and second means for holding is provided with a lubricating means at a location in contact there between.

27. A light source unit for emanating light beams, comprising:

a plurality of light emitting means for emitting light;

a plurality of optical coupling means each corresponding to a light emitting means of said plurality of light emitting means;

an optical coupling holding means having a first and a second means for holding a first optical coupling means of said plurality of optical coupling means, said first and second means for holding being aligned approximately in parallel to an optical axis of said first optical coupling means; and an elastically pressing means for pressing a side portion of said first optical coupling means against said first and said second means for holding so as to hold said first optical coupling means, wherein a portion of said first optical coupling means in contact with said first and second means for holding is subjected to surface hardening.

28. The light source unit according to claim 26 or 27, wherein said elastically pressing means is formed of planar elastic material, and wherein said elastically pressing means has ends fixed to said optical coupling holding means so as to hold in between said ends said portion of said first optical coupling means in contact with said first and second means for holding.

29. The light source unit according to claim 28, wherein said ends of said elastically pressing means are fixed approximately symmetric with respect to said portion of said first optical coupling means in contact with said first and second means for holding.

30. A light source unit for emanating light beams, comprising:

a plurality of light emitting means for emitting light;

a plurality of optical coupling means each corresponding to a light emitting means of said plurality of light emitting means;

an optical coupling holding means having a first and a second means for holding a first optical coupling means of said plurality of optical coupling means, said first and second means for holding being aligned approximately in parallel to an optical axis of said first optical coupling means; and an elastically pressing means for pressing a side portion of said first optical coupling means against said first and said second means for holding so as to hold said first optical coupling means, wherein said elastically pressing means is formed of planar elastic material, and wherein said elastically pressing means has ends fixed to said optical coupling holding means so as to hold in between said ends said portion of said first optical coupling means in contact with said first and second means for holding, and wherein said elastically pressing means has a coefficient of linear expansion approximately equal to that of a material of said optical coupling holding means.

31. A light source unit for emanating light beams, comprising:

a plurality of light emitting means for emitting light;

a plurality of optical coupling means each corresponding to a light emitting means of said plurality of light emitting means;

an optical coupling holding means having a first and a second means for holding a first optical coupling means of said plurality of optical coupling means, said first and second means for holding being aligned approximately in parallel to an optical axis of said first optical coupling means; and an elastically pressing means for pressing a side portion of said first optical coupling means against said first and said second means for holding so as to hold said first optical coupling means, further comprising:

a light source holding means for holding a first light emitting means of said plurality of light emitting means attached to said optical coupling holding means, said first light emitting means corresponding to said first optical coupling means, wherein said optical coupling holding means, a package means of a semiconductor laser diode, and said light source holding means are formed of materials which are selected to satisfy the following relationships:

$$\alpha1 \leq \alpha3,\ \alpha1 \leq \alpha2 \leq \alpha3\text{ and }\alpha1 \leq \alpha4 \leq \alpha3,$$

where $\alpha1(1/K)$, $\alpha2(1/K)$, $\alpha3(1/K)$ and $\alpha4(1/K)$ are coefficients of linear thermal expansion of said first optical coupling means, said optical coupling holding means, said package means and said light source holding means, respectively.

32. A light source unit for emanating light beams, comprising:

a plurality of light emitting means for emitting light;

a plurality of optical coupling means each corresponding to a light emitting means of said plurality of light emitting means;

an optical coupling holding means having a first and a second means for holding a first optical coupling means of said plurality of optical coupling means, said first and second means for holding being aligned approximately in parallel to an optical axis of said first optical coupling means; and an elastically pressing means for pressing a side portion of said first optical coupling means against said first and said second means for holding so as to hold said first optical coupling means, further comprising:

a light source holding means attached to said optical coupling holding means for holding a light emitting means of said plurality of light emitting means corresponding to said first optical coupling means, wherein said optical coupling holding means, a package means of a semiconductor laser diode, and said light source holding means are formed of materials which are selected to satisfy the following relationships:

$$\alpha3 < \alpha1,\ \alpha3 \leq \alpha2 \leq \alpha1\text{ and }\alpha3 \leq \alpha4 \leq \alpha1,$$

where $\alpha1(1/K)$, $\alpha2(1/K)$, $\alpha3(1/K)$ and $\alpha4(1/K)$ are coefficients of linear thermal expansion of said first optical coupling means, said optical coupling holding means, said package means and said light source holding means, respectively.

33. A light beam scanning unit, comprising:

a light source unit for emanating light beams, comprising:

a plurality of light emitting means for emitting light;

a plurality of optical coupling means each corresponding to a light emitting means of said plurality of light emitting means;

an optical coupling holding means having a first and a second means for holding a first optical coupling means of said plurality of optical coupling means, said first and second means for holding being aligned approximately in parallel to an optical axis of said first optical coupling means; and an elastically pressing means for pressing a side portion of said first optical coupling means against said first and said second means for holding so as to hold said first optical coupling means;

a light source holding means attached to said optical coupling holding means for holding a first light emitting means of said plurality of light emitting means corresponding to said first optical coupling means;

a light beam deflecting means for receiving and subsequently deflecting light beams emanated from said first light emitting means; and a focusing and scanning means for focusing the light beams onto a means to be scanned and scanning along a primary scanning direction, wherein said first optical coupling means, said optical coupling holding means, a package means of a semiconductor laser diode, and said light source holding means are formed of materials which are selected in terms of coefficients of linear thermal expansion $\alpha 1$, $\alpha 2$, $\alpha 3$ and $\alpha 4$, and radii r1 and r3 are adjusted such that a positional deviation of the light beams on said means to be scanned is controlled to be equal to, or smaller than 50% of a dot pitch of the light beams, and wherein $\alpha 1(1/K)$, $\alpha 2(1/K)$, $\alpha 3(1/K)$ and $\alpha 4(1/K)$ are coefficients of linear thermal expansion of said first optical coupling means, said optical coupling holding means, said package means and said light source holding means, respectively; r1 (mm) is a distance from an optical axis of said first optical coupling means to a point of contact between said first optical coupling means and said first and second means for holding; and r3 (mm) is an outer radius of said package means.

34. The light beam scanning unit according to claim 33, wherein a plurality of light beams are scanned, the plurality of light beams each being emanated by a plurality of said light emitting means arranged in a row.

35. A light beam scanning unit, comprising:
a light source unit for emanating light beams, comprising:
a plurality of light emitting means for emitting light;
a plurality of optical coupling means each corresponding to a light emitting means of said plurality of light emitting means;
an optical coupling holding means having a first and a second means for holding a first optical coupling means of said plurality of optical coupling means, said first and second means for holding being aligned approximately in parallel to an optical axis of said first optical coupling means; and an elastically pressing means for pressing a side portion of said first optical coupling means against said first and said second means for holding so as to hold said first optical coupling means;

a light source holding means attached to said optical coupling holding means for holding a first light emitting means of said plurality of light emitting means corresponding to said first optical coupling means;

a light beam deflecting means for receiving and subsequently deflecting light beams emanated from said first light emitting means; and a focusing and scanning means for focusing the light beams onto a means to be scanned and scanning along a primary scanning direction, wherein said first optical coupling means, said optical coupling holding means, a package means of a semiconductor laser diode, and said light source holding means are formed of materials which are selected in terms of coefficients of linear thermal expansion $\alpha 1$, $\alpha 2$, $\alpha 3$ and $\alpha 4$, and radii r1 and r3 are adjusted so as to satisfy the following relationships:

$\alpha 2 = \alpha 4$, and $|\alpha 3 \times r3 - \{\alpha 1 \times r1 + \alpha 2 \times (r3 - r1)\}| \leq 2.5 \times 10^{-5}$ (mm/K where $\alpha 1(1/K)$, $\alpha 2(1/K)$, $\alpha 3(1/K)$ and $\alpha 4(1/K)$ are coefficients of linear thermal expansion of said first optical coupling means, said optical coupling holding means, said package means and said light source holding means, respectively; r1 (mm) is a distance from an optical axis of said first optical coupling means to a point of contact between said first optical coupling means and said first and second means for holding; and r3 (mm) is an outer radius of said package means.

36. The light beam scanning unit according to claim 35, wherein:
$\alpha 3 \times r3 - \{\alpha 1 \times r1 + \alpha 2 \times (r3 - r1)\}$ is equal to, or smaller than 1 μm at normal temperatures.

37. The light beam scanning unit according to claim 35, wherein a plurality of light beams are scanned, the plurality of light beams each being emanated by a plurality of said light emitting means arranged in a row.

38. An image forming apparatus, comprising:
said light beam scanning unit recited in anyone of claims 33 through 37; and
an image forming means for rendering an image visible, said image being written by said light beam scanning means onto an image bearing means corresponding to input image data.

39. The image forming apparatus according to claim 38, wherein said light beam scanning unit and said image forming means are provided for each color rendered visible by said image forming apparatus.

* * * * *